Nov. 12, 1968  L. G. MILLER ET AL  3,410,235

SHOE MANUFACTURING MACHINES AND METHODS

Filed Oct. 21, 1965  14 Sheets-Sheet 1

Inventors
Robert W. Bradley
Lloyd G. Miller
By their Attorney
Edward W Fearing

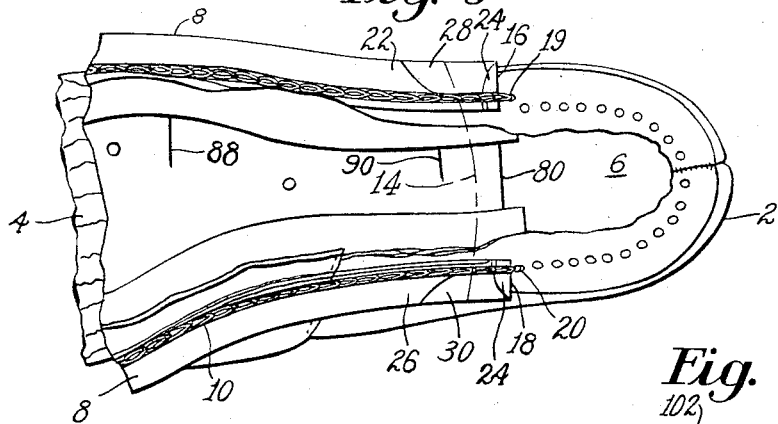
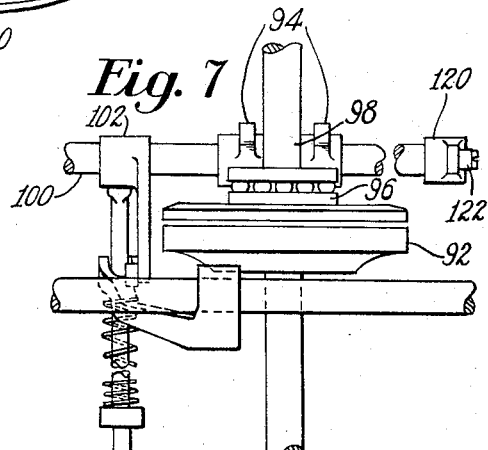
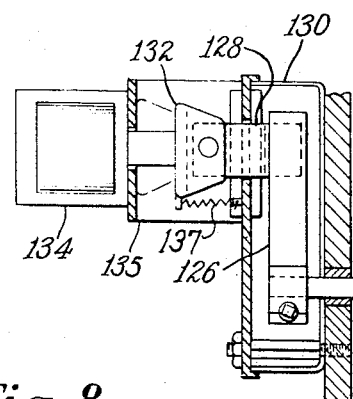
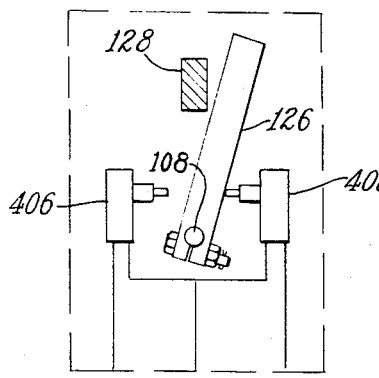
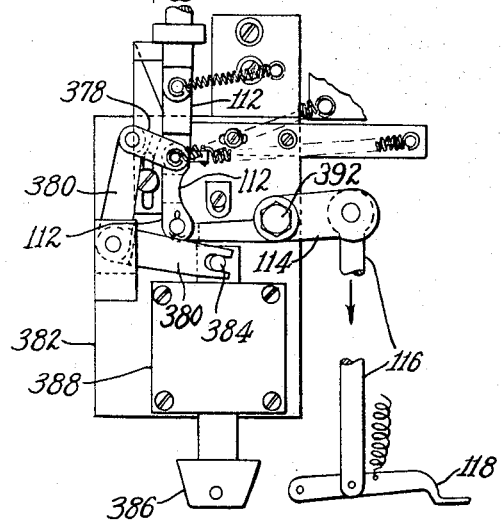

Nov. 12, 1968    L. G. MILLER ET AL    3,410,235
SHOE MANUFACTURING MACHINES AND METHODS
Filed Oct. 21, 1965    14 Sheets-Sheet 5
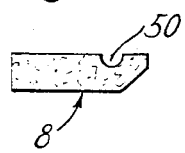
Fig. 9
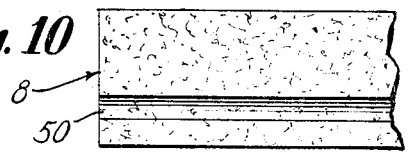
Fig. 10
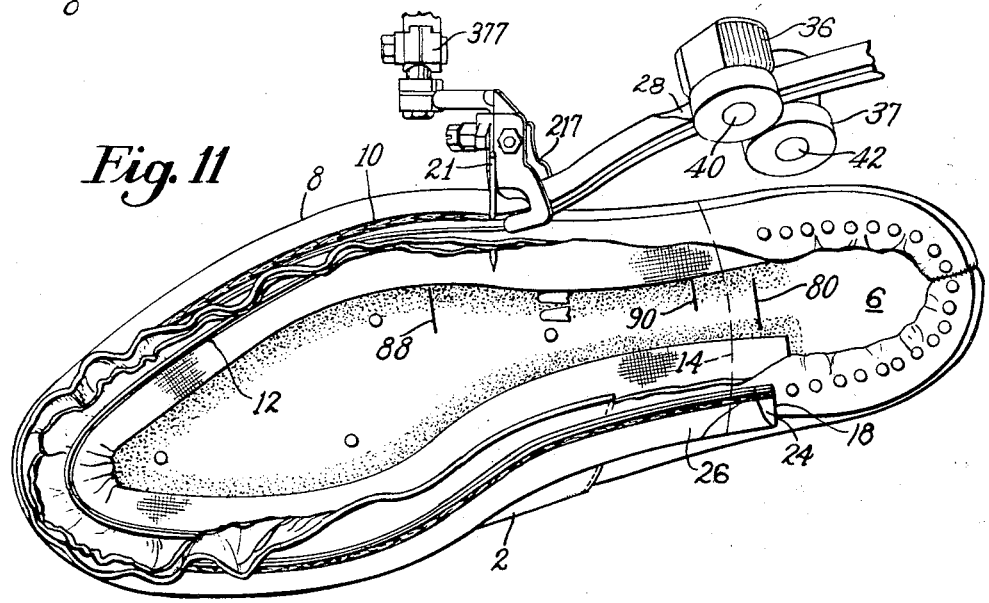
Fig. 11
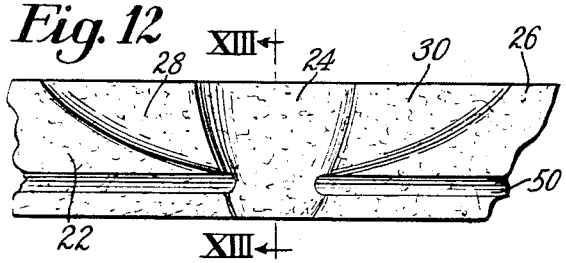
Fig. 12
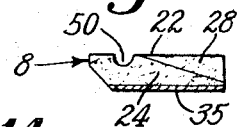
Fig. 13
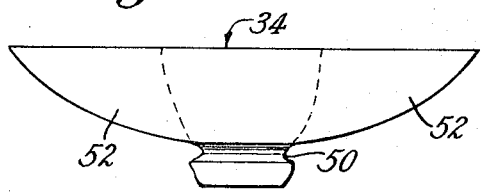
Fig. 14
Fig. 16
Fig 15
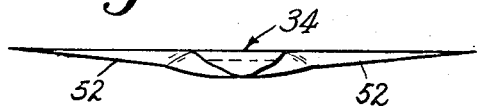
Fig. 17

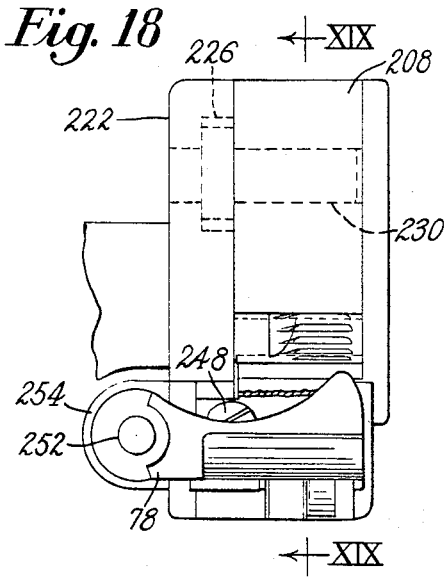
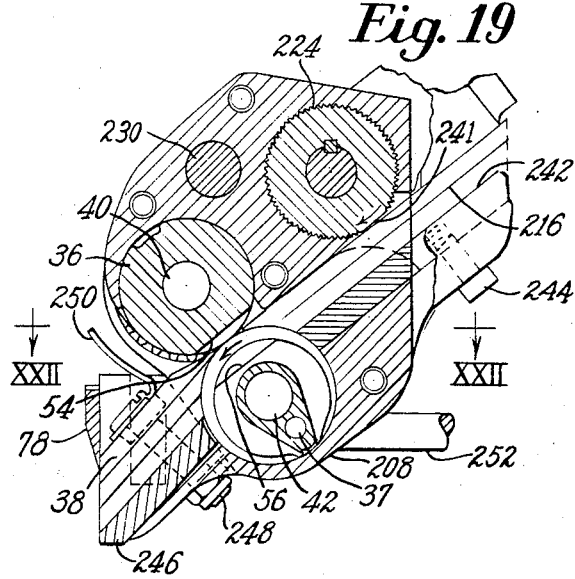
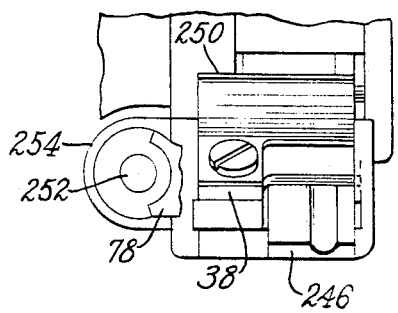
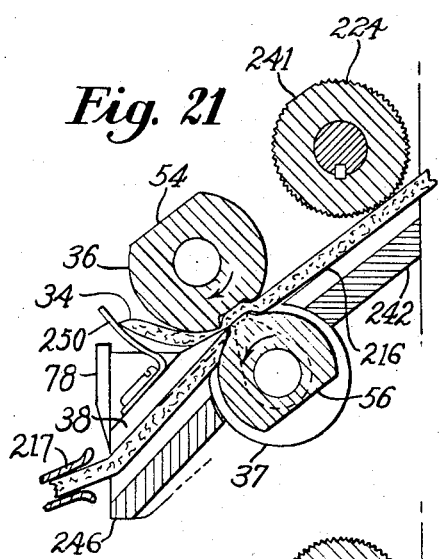
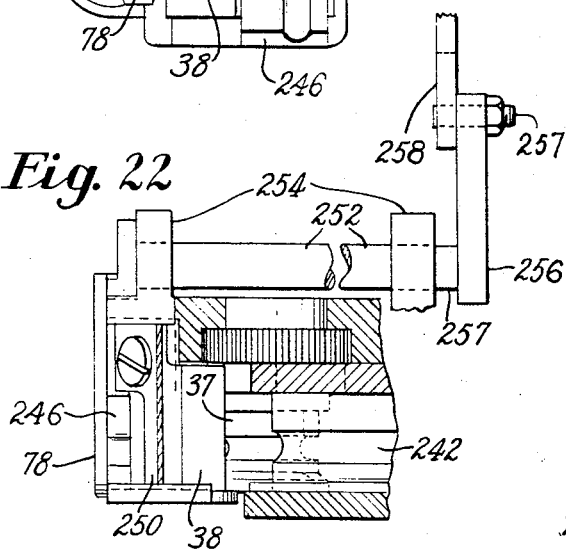
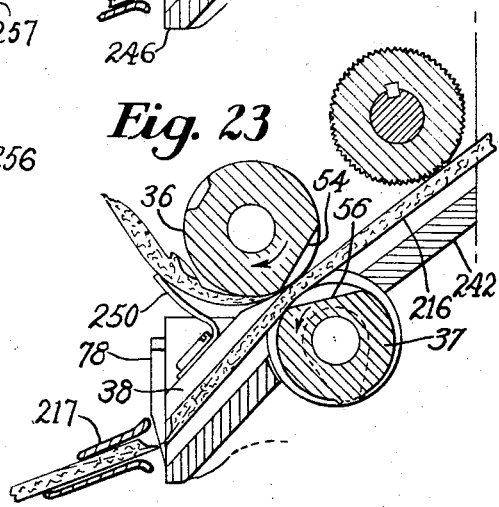

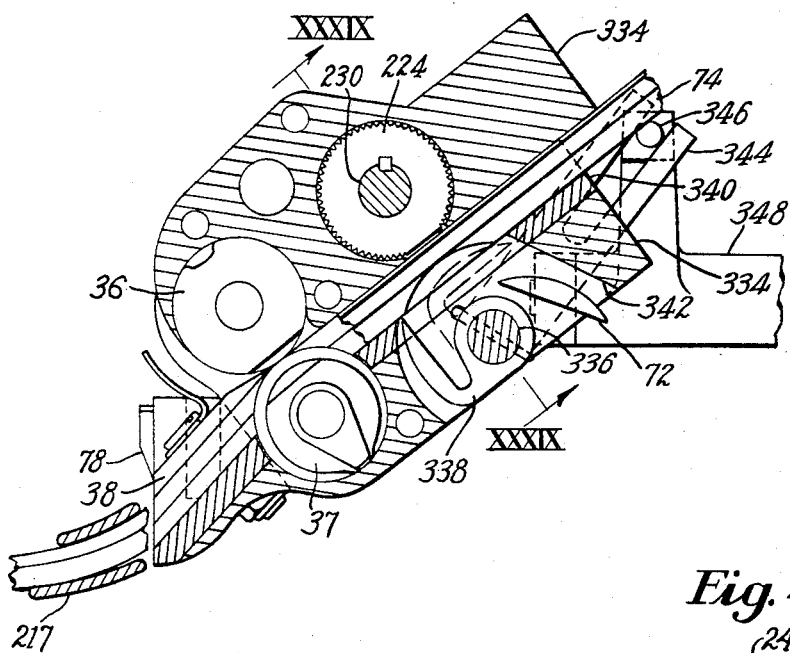
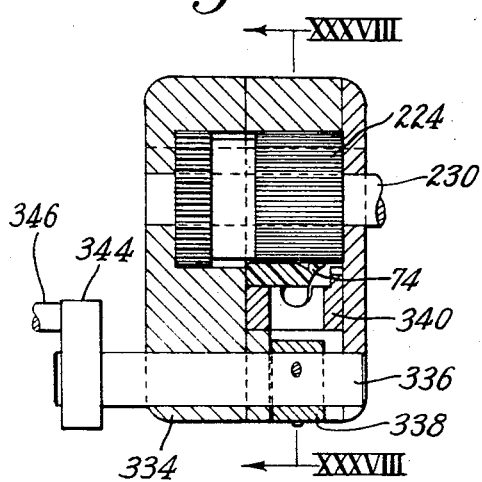
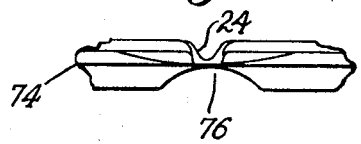

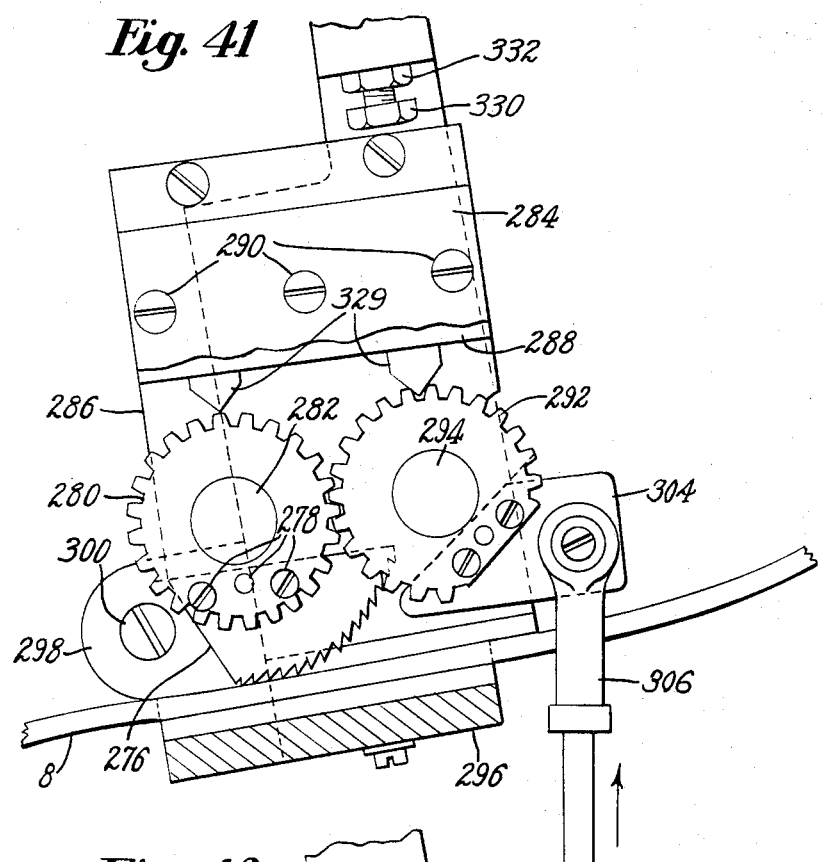
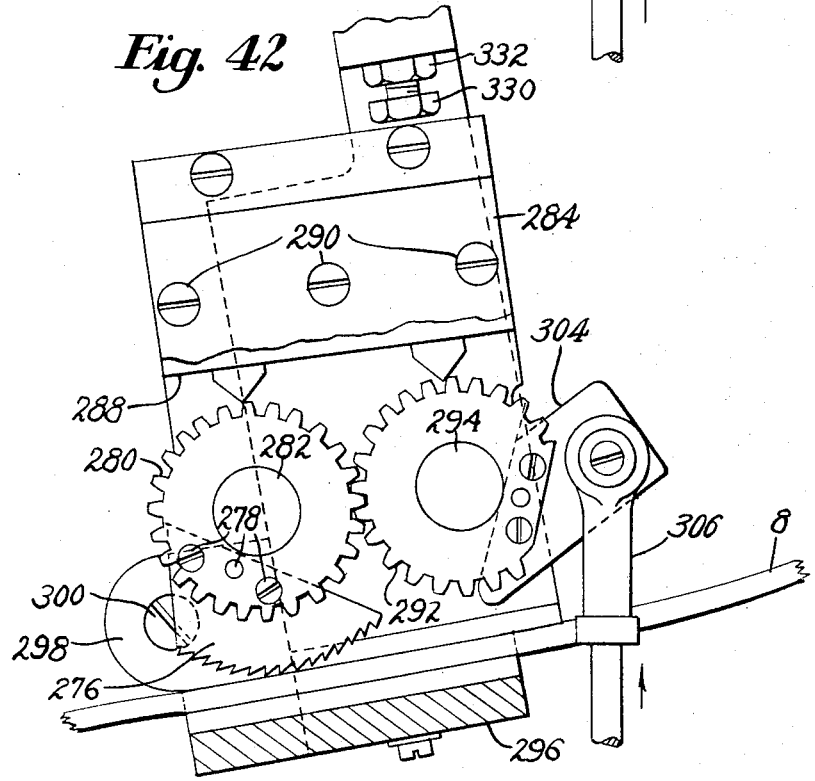

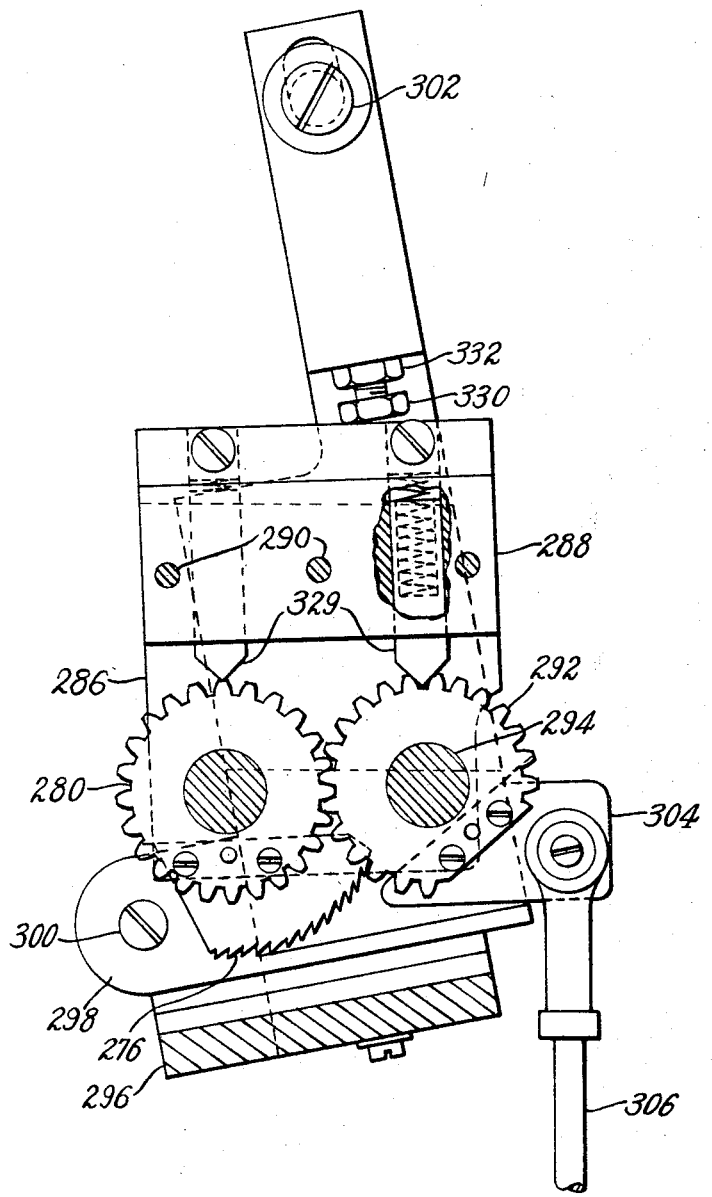

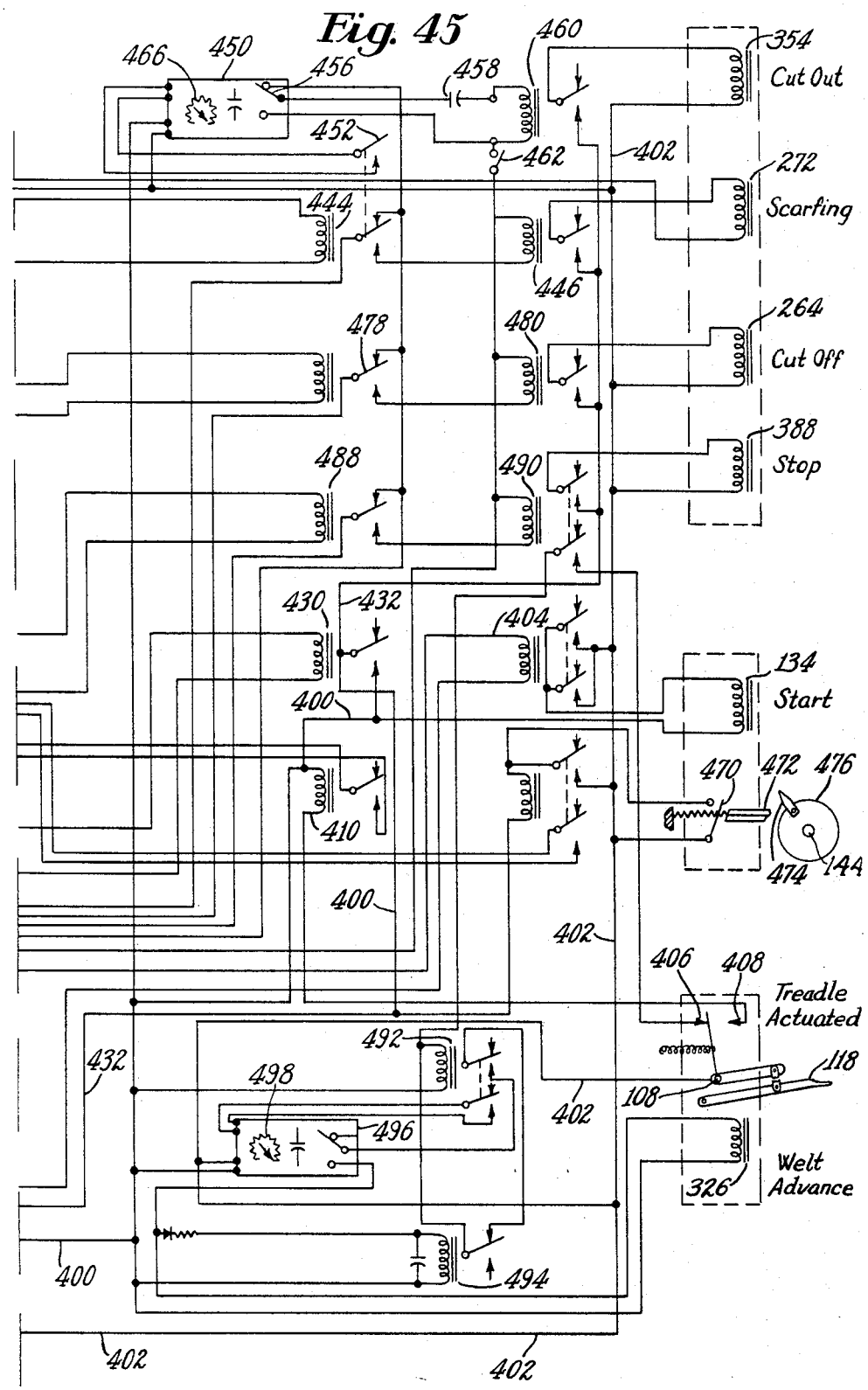

United States Patent Office 3,410,235
Patented Nov. 12, 1968

3,410,235
SHOE MANUFACTURING MACHINES
AND METHODS
Lloyd G. Miller, Beverly, and Robert W. Bradley,
Marblehead, Mass., assignors to United Shoe Machinery Corporation, Flemington, N.J., and Boston,
Mass., a corporation of New Jersey
Filed Oct. 21, 1965, Ser. No. 500,106
21 Claims. (Cl. 112—46)

ABSTRACT OF THE DISCLOSURE

A shoe inseam sewing machine including apparatus for progressively reducing the thickness of the welt in advance of the sewing point and for severing the welt to provide a tapered trailing end on the welt ahead of the severing point and a tapered leading end behind the severing point for the next welt attaching operation.

The present invention relates to improved shoe machines and to simplified methods of making shoes with such machines, which enable a shoe construction having often desired but heretofore unattainable advantages in manufacture, with time saving and quality producing results, especially applicable to Goodyear welt shoe manufacturing procedures.

United States Letters Patent No. 3,055,323, granted Sept. 25, 1962, upon application of the present inventors, discloses a Goodyear inseam sewing machine having automatic welt severing mechanisms, which enable insertion of a continuous inseam across a joint formed by matching bevel cuts at the ends of a Goodyear welt in a shoe. The patented machine utilizes a feeler arranged for engagement with the leading end of the welt after first being attached to the shoe, the feeler acting to set in motion the welt severing mechanisms sufficiently in advance of the sewing point to enable the severed ends to be matched with a high degree of accuracy and the final stitches of the inseam to be inserted across the completed joint.

While the machine of the patent is of great advantage in making shoes in which a welt is sewn entirely around the shoe bottom, including the heel seat, it is not of particular benefit when ordinary Goodyear welt shoes are being sewn, in which the welt terminates at either side of the heel breast, no matched bevel cut joint between the ends of the welt being there required.

A primary object of the present invention is to provide a machine for automatically reducing or prebutting the ends of a welt with tapering or scarfed areas while being sewn by an inseam extending about the bottom of a Goodyear welt shoe from heel breast to heel breast without stopping the operation of the machine or in any other way interfering with the tension on the threads or the effectiveness of the stitches being inserted. In this respect, the present invention represents a fulfillment of a desire expressed in U.S. Letters Patent No. 1,510,723, granted Oct. 7, 1924, upon application of Lawrence E. Topham.

A secondary object of the invention is to provide automatic welt scarfing or butting mechanism for a Goodyear welt inseam sewing machine arranged to enable insertion of an inseam to be started substantially in advance of a full thickness area at the leading scarfed end on a welt, so that stitches may be inserted both in starting and in stopping, partially, if not completely, across the scarfed area at the trailing end of the welt, thus providing attaching, feeding and guiding devices for binding both ends securely in place to the insole against displacement during further shoemaking operations.

Contributory objects are to provide an improved method of making shoes and to obtain advantageous constructions for welt shoes, in which the welt is attached to the shoe from breastline to breastline by an inseam inserted in an insole in advance of the leading scarfed end of the welt to insure binding of that scrafed area securely in place by thread stitches, the trailing end of the welt also being scarfed and similarly bound to the insole, so that there is no need for any separate welt end butting and attaching operations to be performed by increasing and decreasing the thicknesses at the ends of the welt progressively along its length after the inseam is completed.

By the improved machine and method it is possible to sever the welt between scarfed areas of increasing and decreasing thicknesses while the attaching operation on a shoe being operated upon is progressing, thus avoiding interruption of attachment both with respect to continuity of thread and to a controlled tension therein. For the same reason, it is possible to increase the length of the scarfed areas greater than usual, thereby affording a smoother transition of sewing than heretofore from the full thickness of the welt to the bare heel seat area of the shoe with further advantages in appearance and mechanical strength of the resulting shoe.

A common purpose for any sewed seam, especially one in which heavy thread is employed, is to provide a flexible binding between the parts operated upon, so that they may be drawn securely together by reason of tension in the thread. If the seam is interrupted either by discontinuity of the thread or by release of tension before completion, even for a short time, then the seam becomes loosened to the extent that an insecure attachment may occur even though the thread itself remains intact. Accordingly, the method of the present invention comprises simultaneously inserting a thread inseam and butting opposite ends of the welt to form adjacent scarfed areas of increasing and decreasing thickness before the final end of the welt is sewn to the shoe, the welt being thereupon severed between its increasing and decreasing thickness areas, while the insertion of the inseam is progressing. After inserting the initial and final stitches of the inseam the stitching is continued without any break in continuity of the thread or relaxed tension along the thread, stitches being inserted across the scarfed area at the trailing end of the welt to form a uniform binding of that area. Preferably also, the thread in the initial and final stitches of a new seam pass without interruption from the insole across the leading and trailing ends of the welt sewn to a shoe with similar benefits. Such shoemaking methods and constructions are distinguished from those heretofore employed, which require tacks or other metallic fastenings in the leading and trailing ends of the welt to hold them in place.

Heretofore, welt butting operations have always been performed after inserting an inseam of a Goodyear welt shoe, except in the practice of the method disclosed in the Topham patent. This is because the stitches are destroyed by the butting mechanisms if the reduced or scarfed areas for butting the welt ends are made before any stitches are inserted along these areas. Even in the method of the Topham patent, the advantage of inserting binding stitches across the butted areas is not anticipated, the inseam being started beyond the scarfed area at the leading end and being terminated before the scarfed area at the trailing end is reached and the butted ends on the welt being left free for displacement in the absence of supplemental tacks or other metallic fasteners after the inseam is completed. These failures on the part of the Topham machine are, in part, the result of scarfing the welt by passing a skiving knife across it rather than attempting to scarf the welt progressively with the sewing.

These and other features of the invention, as hereinafter described and claimed, will readily be apparent from the following detailed specification taken in connection with the accompanying drawings, in which FIG. 1 is a perspective view looking from the right front at a partly broken away head on an improved inseam sewing machine capable of performing the method and of completing a shoe construction embodying the present invention;

FIG. 6 is a plan view showing the heel end portion of a shoe, about the bottom of which a welt has been attached by an inseam, the final stitches of which are inserted with the thread extending across the scarfed areas and the extreme ends of the welt;

FIG. 7 is a detail view in front elevation of portions of driving and stop control mechanisms employed in the machine for insuring that the initial and final stitches of a seam will be inserted in the proper positions with relation to the scarfed ends of welt in a shoe;

FIG. 8 is a sectional detail view of devices for locking the driving control mechanism out of operation until a new shoe is properly presented to stitch forming devices employed in the machine;

FIG. 9 is an end view on an enlarged scale of a conventional form of flat welt employed in the machine;

FIG. 10 is a plan view of the welt shown in FIG. 9 before the welt is scarfed by the machine;

FIG. 11 is a plan view of a shoe taken while being operated upon by the machine of FIGS. 1 and 3, showing the relationship of the welt and other shoe parts as the welt is being directed toward the point of sewing operations;

FIG. 12 is an enlarged plan view showing two connected scarfed areas on a flat leather welt made prior to severing it at the end of a seam;

FIG. 13 is a sectional view of one scarfed area on a flat welt taken across its mid-portion, as indicated by the line XIII—XIII of FIG. 12;

FIG. 14 is a plan view of a chip removed from a flat welt in forming the scarfed areas;

FIG. 15 is an edge view of the chip shown in FIG. 14;

FIG. 16 is an edge view along the scarfed areas of a flat welt looking at its lower edge, as shown in FIG. 12;

FIG. 17 is a detail view of the scarfed areas of a flat welt looking at the upper edge shown in FIG. 12;

FIG. 18 is a detail view on an enlarged scale looking from the left of the machine head at a welt scarfing and severing mechanism contained therein;

FIG. 19 is a sectional view of the welt scarfing and severing mechanism taken along the line XIX—XIX of FIG. 18;

FIG. 20 is a detail view of a lower portion of the scarfing mechanism shown in FIG. 18 with a welt severing knife broken away to show the underlying structure;

FIG. 21 is a sectional detail view similar to that shown in FIG. 19 with stationary parts omitted, illustrating the operation of the scarfing mechanism after having completed the first half of an operation on a flat welt;

FIG. 22 is a sectional plan view of a portion of the welt scarfing and severing mechanism as viewed from the line XXII—XXII in FIG. 19;

FIG. 23 is a sectional detail view similar to that of FIG. 21, showing the scarfing mechanism after having completed its operation and the welt having been severed across a reduced area of minimum thickness;

FIG. 38 is a sectional view showing modified forms of welt scarfing and severing mechanisms intended for use with plastic storm welt, taken in section along the line XXXVIII—XXXVIII of FIG. 39;

FIG. 39 is a sectional view of the modified forms of scarfing and severing mechanisms shown in FIG. 38, taken along the line XXXIX—XXXIX of that figure;

FIG. 40 is an edge view of vinyl or other plastic storm welt after having been operated upon by the scarfing mechanism of FIGS. 38 and 39;

FIG. 41 is a sectional detail view in front elevation of a welt advancing mechanism employed in the machine, showing the positions of the parts assumed during welt advancing movements;

FIG. 42 is a similar view of the same mechanism with the parts shown in positions assumed at the end of the welt advancing movements;

FIG. 43 is a similar view of the same parts shown in positions assumed during normal sewing operations in the machine; and FIGS. 44 and 45 are a pair of wiring diagrams illustrating, when taken together, the connections between the electrical control components in the machine.

Figure 1:
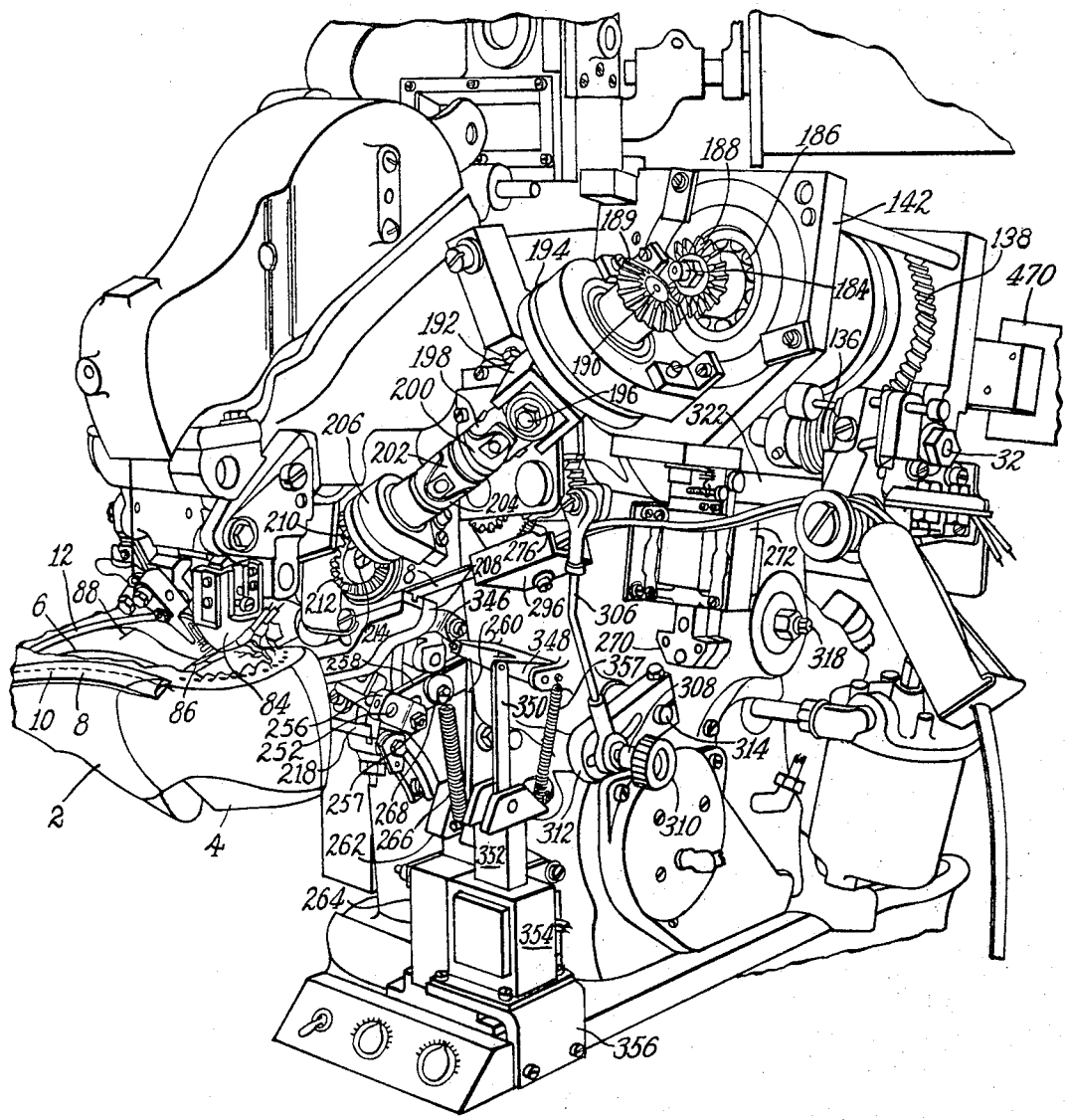

As illustrated, one feature of the invention is embodied in a semiautomatic shoe inseam sewing machine, in which a last supported shoe is presented to the machine by an operator and, when adjusted into proper initial position, it is possible to start operations. The operations consist of inserting an inseam beginning in advance of a previously scarfed or prebutted area on a leading end of a length of welt. The inseam is inserted in the shoe by forming at least one stitch passing first through an upper, an insole of the shoe, to the exclusion of the welt. Then other stitches are formed running through the welt, upper and an upstanding rib on the insole, which is supported on a last, binding the leading prebutted end in place to the insole. Unless it is necessary to stop the machine during the course of inseaming as a result of improper functioning of the machine, the inseam is continued without interruption until it is completed with stitches intersecting the maximum thickness of the welt and crossing a second scarfed area of decreasing thickness to form a trailing prebutted end on the welt. The second scarfed area of the welt of decreasing thickness merges with a second area of increasing thickness to form a leading prebutted end for a succeeding length of welt. The welt is then severed at its point of minimum thickness between the areas of decreasing and increasing thickness, so that one or more stitches may be inserted with the thread extending uninterruptedly across the prebutted area at the trailing, prebutted end to enter the upper and sewing rib beyond the trailing end, thus binding that end firmly to the insole and to the other parts of the shoe. After binding the scarfed area of minimum thickness at the trailing end of the welt to the shoe the machine is automatically brought to rest, the next scarfed area at the leading prebutted end being left in the machine preparatory to starting an inseam on a new shoe. Thus, when the inseam is started on a new shoe one or more stitches are inserted, first entering the upper and sewing rib only, and thereafter crossing the scarfed area at the prebutted leading end of the welt remaining in the machine. In this way both ends of the welt are prebutted and bound firmly to the shoe by the machine of the invention with stitches crossing the scarfed areas to prevent displacement of the ends during subsequent shoemaking operations.

In the accomplishment of the steps of prebutting the leading end of the welt remaining in the machine, starting the machine in operation, scarfing the welt during insertion of the inseam, and severing the welt to complete the trailing and leading ends on successive lengths of welt, a series of indicator marks are utilized on the insole. The indicator marks are located along a line in which the inseam is to be inserted and are arranged to control successively different auxiliary devices for performing these operations. The auxiliary devices are so arranged that the operations will be completed in the order and relationship corresponding to the points on the shoe in which the operations are initiated by the marks.

To economize in the use of available space surrounding the operating point in the machine for suitable auxiliary operation performing devices, the approach of all the marks to the sewing point is registered by a single sensing or feeler device, acting sequentially to control the essential auxiliary operations. Also, in order to avoid accidental operation of the devices for performing the auxiliary operations, an over-all safety control is rendered operative whenever the tension in the sewing thread fails, so that the auxiliary operations will be omitted upon improper sewing operations.

The shoe produced by the machine through sequential operation of the auxiliary operation performing devices differs from that capable of being reproduced by prior machines or methods, in that the entire length of the welt from breastline to breastline on a shoe, including scarfed areas at the ends is bound firmly in place with relation to the upper and insole by uniformly tightened stitches.

Referring more particularly to FIGS. 1, 6 and 11 of the drawings, it will be seen that the shoe illustrated comprises the upper, indicated at 2 surrounding the last, indicated at 4 on the tread surface of which a ribbed insole, indicated at 6 is mounted. To connect the parts of the shoe, the welt, shown at 8, has its leading end prebutted and directed against the marginal portion of the upper, and the inseam, shown at 10, is inserted, passing through the welt, the upper and the rib 12 on the insole. The inseam is started and ended at opposite sides of the shoe, so that the ends of the welt will extend substantially beyond a line, indicated by a dot-dash curve 14 and defined by the forward breast edge of a heel eventually to be attached to the shoe.

The usual practice in sewing a Goodyear welt to a shoe is to provide a surplus of approximately an inch and a half beyond the ends of the inseam connecting the parts. After the welt has been sewn to the shoe heretofore, the excess length at the ends is trimmed off and scarfed to reduce its thickness in a butting operation. This butting operation is to enable the ends of the welt to merge with the upper surface of a later attached outsole between the forepart and the heel seat, so that inconspicuous joints will be formed. In trimming the ends of the welt to remove the excess lengths, one or more stitches of the inseam usually are cut through, leaving the ends of the welt free to become displaced during subsequent operations upon the shoe. To avoid displacement of the butted welt ends in the shoe, it is the practice to drive one or more tacks at each end, so that the welt ends will be secured in place while attaching the outsole. To secure the welt ends in this way a separate butting operation on the shoe and the use of a complex, somewhat expensive machine are required. Furthermore, the usual butting operation is conducive to substantial wastage of welt which must be severed from the excess welt ends.

In accordance with the present invention, a separate welt butting operation is rendered unnecessary and the use of tacks or other metallic fasteners to secure the butted welt ends in position is eliminated. With reference more particularly to FIG. 6, it will be apparent that the welt 8 is fastened at its extreme ends 16 and 18 to the other parts of the shoe by the inseam 10 itself, the thread in the stitches of which continues uninterruptedly across the extreme ends with one or more stitches 19 and 20 overlapping the upper without entering either end. By overlapping the upper the welt is attached securely to the rib 12 of the insole so that fewer tacks are needed in the heel seat area. To insure a firm anchorage in the insole rib it is desirable to extend the ends of the rib further than usual beyond the breast line 14.

The machine of the invention is equipped with automatic devices for scarfing the welt simultaneously with the insertion of the inseam, so that before the inseam is completed scarfed ends tapered in opposite directions may be formed to assist in sewing across them while inserting inseam stitches. For this reason there is no necessity for scarfing the welt ends after being sewn, so that the stitches will be left intact to form a firm binding for the ends without the use of metallic fasteners. Not only does a construction of this nature in a shoe improve the durability of the shoe and eliminate the corrosive effects of the metal fasteners, but it also reduces the danger of dulling a power driven knife ordinarily utilized in trimming the inseam and the surplus margin of the shoe parts during a subsequent operation.

Except as hereinafter pointed out, the illustrated machine is provided with a curved hook needle 21 (see FIG. 11) and other chain stitch inseam sewing devices and their actuating mechanisms, similar to those disclosed in Patent No. 3,055,323, above referred to. While the illustrated machine is capable of operating entirely around the marginal portions of a last supported Goodyear welt shoe, as for sewed-heel-seat work, the primary features of the present invention are intended for use in regular heel-breast to heel-breast work, wherein the inseam is started at one side of the shoe and is completed at the other side without continuing around the heel seat.

The operation of the prior patented machine is controlled in part by a mechanical feeler arranged to be engaged by the end of a welt attached to a shoe. The shoe being operated upon by that machine is sewn completely about its periphery including the heel seat and the leading welt end, as it is approaching the point of sewing operations the second time, sets in motion automatic severing mechanism for the welt upon engagement of its leading end with the feeler to cause an electromagnetically actuated knife to intersect the path of the welt.

While the present machine utilizes a knife of the same general type as employed by inventor's prior machine, the prior knife and its electromagnet in their exact forms are not utilized in the present machine, but in their places are substituted automatic welt scarfing and severing devices arranged to engage the welt progressively in advance of the point of operation of the sewing devices for reducing the thickness of the welt along its length, first between an area of maximum thickness 22 (FIGS. 6, 11, 12, 13 and 16), decreasing to one of minimum thickness 24, and thereafter from the area of minimum thickness again increasing to one of maximum thickness 26, thus producing two oppositely disposed scarfed areas 28 and 30 (FIG. 12). At the area 24 (FIG. 12) of minimum thickness the welt is severed to produce butted ends for two successive lengths of welt, the scarfed area 30 of decreasing thickness forming the trailing end of the welt length being sewn to a shoe and the adjacent second scarfed area 28 of increasing thickness forming the leading end of a welt length next to be sewn to a shoe. For this purpose, the welt scarfing devices are driven from a main shaft 32 (see FIGS. 1 and 3) utilized in actuating the sewing and feeding devices of the machine. By driving the welt scarfing devices from the main sewing shaft 32 the progressive action of the scarfing devices along the welt is kept in time with the sewing operation, so that an exact reduction in thickness of the welt will occur regardless of the sewing speed of the machine.

To produce a proper scarfing cut in the welt 8 a chip 34 (best shown in FIGS. 14 and 15) is trimmed progressively along the welt from its flesh surface. This chip is a counterpart of the scarfed areas on the welt and along its maximum thickness, leaving a thin interconnection 35 (FIG. 13) of minimum thickness joining the thicker areas of the welt. It is necessary only to sever this thin interconnection in the welt to separate the two ends 16 and 18 (FIG. 6) from each other. The advantage of removing the chip by progressively cutting the welt along its length rather than by a crosswise cutting or milling action is that the single piece chip resulting is readily discharged from the machine with less opportunity to clog the operating parts.

Figure 34:
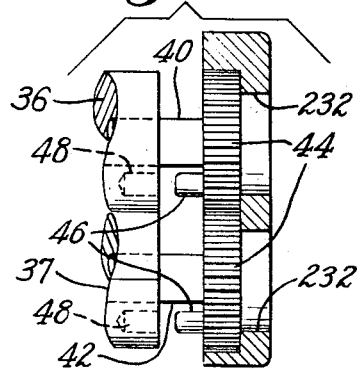
FIG. 34 is a detail view, illustrating the manner of removing a pair of welt deforming rolls from the scarfing mechanism.
Figure 36:
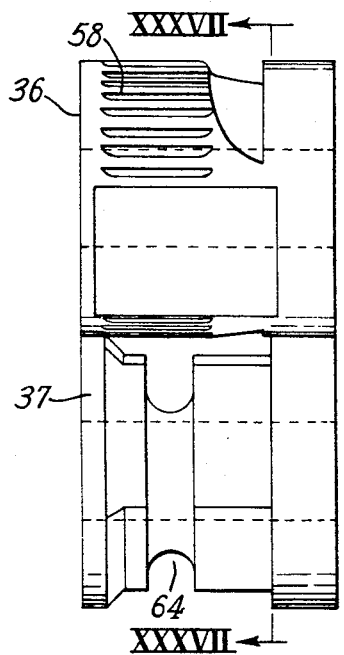
FIG. 36 is a detail view on an enlarged scale of the deforming rolls.

The progressive scarfing and feeding mechanisms comprise primarily a pair of contoured welt deforming and feeding rolls 36 and 37 (see FIG. 36) having the proper complemental contours to cause the chip 34 to be trimmed from the welt by the engagement of a straight-edged stationary knife 38 acting along a line just beyond the gripping bite of the rolls on the welt. Both rolls 36 and 37 are replaceably mounted on a pair of parallel shafts 40 and 42, as best shown in FIG. 34, and driven from the main sewing shaft 32. To insure that the rolls may always be applied to the parallel shafts 40 and 42 in proper angular relationship, a pair of meshing spur gears 44 secured to the shafts connect them for simultaneous rotation and the gears are provided with axially extending dowel pins 46 arranged to enter perforations 48 in sides of the respective rolls.

The roll 36 serves as a matrix in formation of the chip 34, the peripheral surface of that roll having a contour which fits the chip. It will be noted in this connection that the portion 24 of minimum thickness in the welt corresponds to the thickest central portion of the chip, the welt having its flesh surface formed with a gouge extending completely across it, leaving only the thin interconnection 35 at the remaining grain side of the welt. It is only in the central portion of the chip that the full width of the flesh surface is removed from the welt, the portion 24 of minimum thickness intersecting an inseam receiving groove 50 in the welt, so that a portion of the groove is found in the chip. The two ends 52 of the chip spread out as tapering thickness areas in opposite directions similar to a pair of wings. In this way the outer edge of the welt is formed with gradually tapering thicknesses from the maximum thickness portions 22 and 26 through the scarfed areas 28, 30, finally reaching the area 24 of minimum thickness, the inner edge being reduced more abruptly through a short distance below the groove 50. The minimum thickness area 24 is flared somewhat at its outer visible edge to provide a somewhat longer dimension than along the inner edge. In this way the outer visible edge of the welt is tapered more gradually while the inner edge along which the seam is inserted is reduced more abruptly with greater thickness to provide good holding strength for the stitches inserted in the groove 50.

Figure 37:
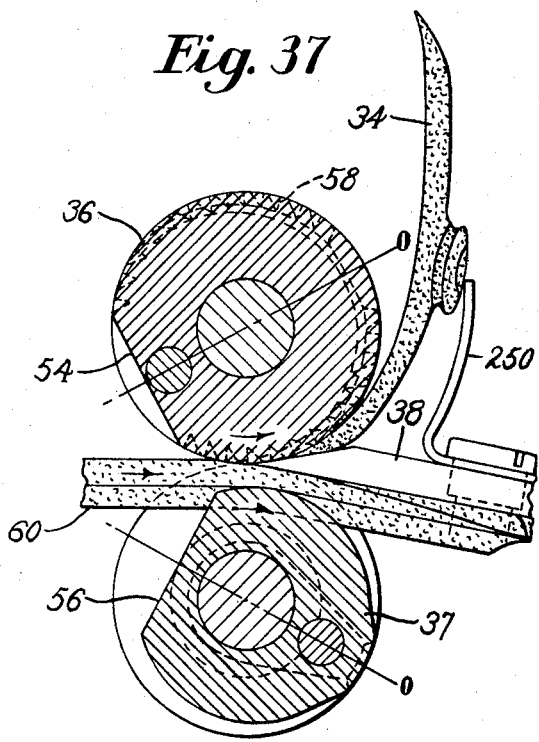
FIG. 37 is a sectional view of the deforming rolls taken along the line XXXVII—XXXVII of FIG. 36, showing the completion of their action on a storm welt.

The roll 37 acts as a support for the welt and has raised areas to press the welt into the cavities and cut-away areas of the matrix roll 36. In this respect the contour of the roll 37 is directly opposite that of the roll 37, except for a flat section 54 on the roll 36, which is disposed opposite to a similar flat section 56 on the roll 37 to provide a clearance space for free movement of the welt between the rolls during a major portion of each sewing operation. To assist in feeding the welt during the scarfing operation, the matrix roll 36 also has a series of axial grooves 58 (FIGS. 36 and 37) extending about a portion of its periphery, particularly along that section wherein the thickest portion of the chip is being trimmed.

Figure 24:
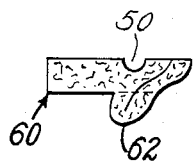
FIG. 24 is an end view on an enlarged scale of a leather storm welt capable of being operated upon by the welt scarfing mechanism in the machine.

The illustrated machine is capable of operating upon flat welt 8 of uniform thickness or upon novelty welt, such as storm welt 60 (FIG. 24), a bead 62 projecting from its grain surface opposite to the groove 50 to provide a barrier in the crevice of a shoe against entry of water or other materials tending to impair the strength of the inseam inserted by the machine. In order to pre-butt a welt having a storm bead the support roll 36 is deeply grooved at 64 to sufficient depth to clear the bead.

Figure 25:
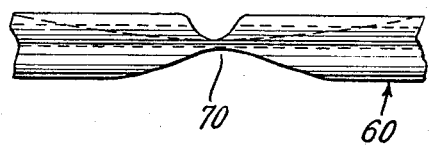
FIG. 25 is a view in edge elevation of a length of leather storm welt after having had formed therein its scarfed areas and before being severed.
Figure 29:
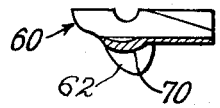
FIG. 29 is a cross sectional view of leather storm welt, at viewed along the line XXIX—XXIX of FIG. 28.

In order to butt properly a storm welt, the thickness of the bead 62 also must be reduced at the pre-butted end of the welt and for this purpose while operating upon a leather welt it has been found sufficient merely to compress the thickness of the welt substantially beyond its elastic limit and to deform permanently the cross-sectional area of the welt at the same position where it is to be severed. In so doing, the supporting roll 36 is formed with a lengthwise rib 66 (FIG. 27) and the matrix roll 35 has a coincident recess 68, which when brought into register with the rib 66 squeezes the bead 62 to form a permanent indentation 70, as shown in FIGS. 25 and 29. Compression and severing of the welt in this way enables a smooth, clean scarfing cut to be formed and the bead is merged with the exposed flat grain area of the welt.

The means for compressing the welt beyond its elastic limit to reduce the height of the storm bead at the pre-butted ends of successive welt lengths is particularly effective for welt composed of leather, inasmuch as compression preserves the finished grain surface of the welt along its exposed area after completion of the inseam. With the use of welt composed of plastic material, such as vinyl or other rubbery compounds, the elasticity of the welt is too high to permit permanent deformation. For This reason, it is necessary to cut out a segmental chip 72, best shown in FIG. 38. A plastic storm welt 74 (FIG. 40) is thus left with a cut-out area 76 in the bead at a centered relation with the minimum thickness area 24 of the welt where it is to be severed to form the butted ends of two successive welt lengths. Thus the formation of welt ends composed of easily compressible natural leather or highly elastic synthetic materials are optional and may be provided for by manipulation of convenient controls in the machine.

To sever the scarfed areas formed by the knife 38, the welt being operated upon is engaged by a vertically swinging cut-off knife 78 acting on the welt after it has passed the bite of the matrix and supporting rolls 36 and 37. The distance between the location of the cut-off knife and the point of operation of the needle 21 is quite short, being less than an inch, so that only a few further stitches are required to complete the seam. The final stitches of the seam are then inserted within the scarfed area 28 of decreasing thickness at the trailing end 18 of the welt. From the scarfed area 28 the thread in the stitches continues uninterruptedly across the end 18 of the welt until one or more stitches 20 is inserted in the rib of the insole beyond the welt end 18, as best shown in FIG. 6. After the final stitch has been inserted, the machine is brought to rest automatically.

With the machines of the prior patent it has been the practice for an operator to observe carefully the approach of a seam to its terminal point and to reduce the speed of sewing operations materially as the terminal point of sewing operations is reached, so that the final stitch will be terminated properly. In slowing down the sewing operations in a machine of this type it is quite likely that the uniformity with which the final stitches are inserted will be impaired. Quite frequently the final stitches of an inseam have less tension applied to them when the machine is operating at a low speed than when running at full operating speed.

In the illustrated machine there is no necessity for the operator to reduce the sewing speed as the end of a seam approaches and, in fact, he is encouraged to maintain full operating speed not only for improved uniformity of stitching but also for increased production. For avoiding the necessity of slowing down the machine as the end of an inseam on a shoe approaches, timing mechanism is set into operation for automatically initiating rotation of the scarfing rolls, for stopping the machine with certainty and for bringing it to rest after the welt has been severed at the exact point desired without any attention on the part of the operator after the stopping mark comes into engagement with the feeler and regardless of the position of the treadle. To these ends, a start-stop indicator mark 80 of a series applied to the shoe is inscribed on the insole 6 near the ends of the rib 12 to which the upper and welt are attached by the inseam. The mark 80 runs between the insole ribs close to their ends within the heel seat area of the shoe bottom.

The scarfing and welt cut-off operations are performed to bring the ends 16 and 18 of the welt a short distance further from the toe end of the shoe than the mark 80, so that before the machine stops, one or more stitches will be inserted across the welt ends. For this purpose the machine frame above the point of sewing operations has secured to it a sensing feeler consisting of an insulating block 84 (FIGS. 1 and 3) on which is mounted a pair of yielding contacts 86 arranged to engage sequentially the series of marks on the insole of the shoe. The series of marks, including the start-stop mark 80, are made with electrically conducting ink containing graphite, so that when they engage the feeler contacts 86 a signal will be given to stop the machine. However, stopping may not occur instantaneously with the signal and it is preferred to utilize time delay circuits with the advantage that manual adjustments are possible for accommodating slight variations in accordance with the type of work being performed.

To prepare the machine for a new operation, after being brought automatically to rest, suitable mechanism is provided for advancing the end of the welt 8 remaining in the machine into a position where it may be engaged by the needle in order that a new shoe may be positioned properly with respect to the advanced end of the welt. For preventing the machine from being started in a new operation until the starting mark 80 is brought into engagement with the contacts 86 at the side of the shoe first presented to the machine, it is locked out of operation until the new shoe is properly presented. Circuits also are provided under the control of the contacts 86 for initating rotation of the deforming and feeding rolls 35 and 36 whenever the contacts 86 come into engagement with a scarfing mark 88 and for actuating the cut-off knife 78 whenever the contacts come into engagement with a cut-off mark 90, both of which marks are inscribed on the insole at the side of the shoe where the trailing end of the welt is to be attached. Thus, the times of operation of the auxiliary devices are closely controlled to occur in proper sequence and timed relation one with another.

For applying the marks, a lip cutting scoring and marking machine is employed similar to that disclosed in U.S. Letters Patent No. 2,746,068, granted May 22, 1956 on application of A. S. Clark.

For starting and stopping the illustrated machine under the control of an operator, driving and stopping mechanisms of a common form are employed, as more fully disclosed in U.S. Letters Patent No. 2,041,945, granted May 26, 1936, upon application of A. R. Morrill, and in No. 3,055,323, above referred to. As more fully disclosed in those patents, the present machine is provided with a high-speed driving mechanism and a low-speed stopping mechanism, the latter of which is rendered operative after the main driving mechanism has been thrown out, to slow down the main driving shaft 32 and then to rotate it in a reverse direction to final stopping position.

The high-speed driving mechanism includes a main clutch 92 (see FIG. 7) the parts of which are brought into engagement with each other by disconnectible connections, including a forked member 94 acting against a thrust bearing 96 surrounding a shaft 98 geared to rotate the main shaft 32.

The forked member 94 is secured to a horizontal shaft 100 having also secured to it an arm 102 pivotally connected to the upper end of a link 104, the lower end of which is similarly connected to an arm of a short lever 106 keyed to a rockshaft 108 rotatable in the machine frame. Another arm of the lever 106 projects over a rod 110 in a position to be engaged by the rod whenever it is raised, the lower end of the rod 110 being pivoted to the upper member of a toggle 112. The lower member of the toggle is pivoted to an arm of a lever 114 having depending from it a link 116 connecting to a treadle 118 for controlling by downward pressure of the main clutch the speed of rotation imparted to the main sewing shaft 32.

When the treadle 118 is released, the connections between the treadle and the clutch 92 enable the clutch to be disengaged and the machine to be brought to rest as desired by the operator. Accordingly, an arm 120 secured to the shaft 100 outside of the frame of the machine carries a roll 122 arranged to act on a cam surface of a bell crank 124 (see also FIG. 3). Upward movement of the roll 122 on the bell crank 124 causes the low-speed reverse driving mechanism to be thrown into operation and the machine stopped in a single rotation of the main sewing shaft.

To prevent the machine from being started until a new shoe is presented properly with its conductive mark 80 in engagement with the contacts 86, the driving mechanism is locked out of operation. To this end the shaft 108 projects outside the frame at the left of the machine and carries an upwardly extending arm 126 arranged to be engaged by a slide block 128 movable horizontally through a slot in an outlet box 130 secured to the frame of the machine in surrounding relation to the arm 126. When the slide block engages the side of the arm it locks the arm from movement and prevents the treadle from being depressed. The slide block 128 is pivotally connected to an armature 132 of an electromagnet 134 carried by a yoke 135 fixed to the cover of the box 130. When the conductive mark 80 on a shoe is presented to the machine in engagement with the contacts 86, the electromagnet 134 is energized withdrawing the block 128 from engagement with the arm 126 and releasing the treadle for actuation of the main driving clutch 92. When the solenoid is deenergized the slide block returns to its treadle locking position by reason of a tension spring 137 connected at one end to the armature 132 and at the other end to the cover of the box 130.

Figure 4:
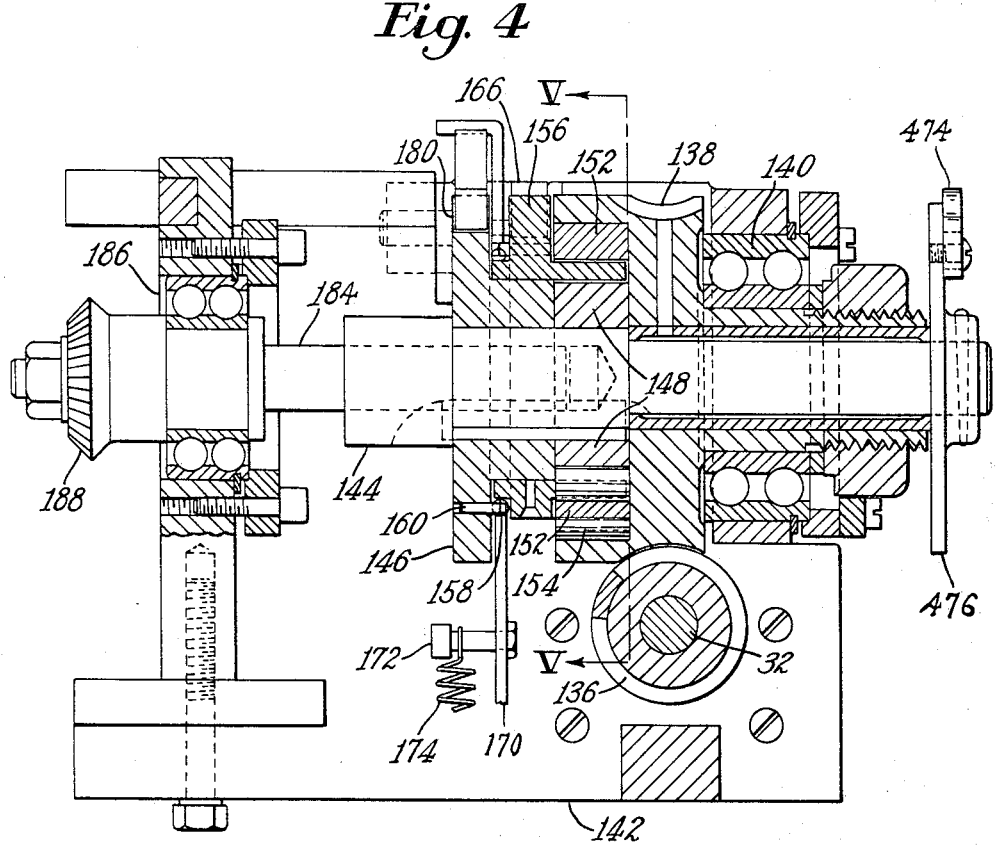
FIG. 4 is a detailed sectional view on an enlarged scale of a one-revolution clutch utilized in the machine of FIGS. 1 and 3 for actuating the welt scarfing mechanisms during insertion of an inseam.
Figure 5:
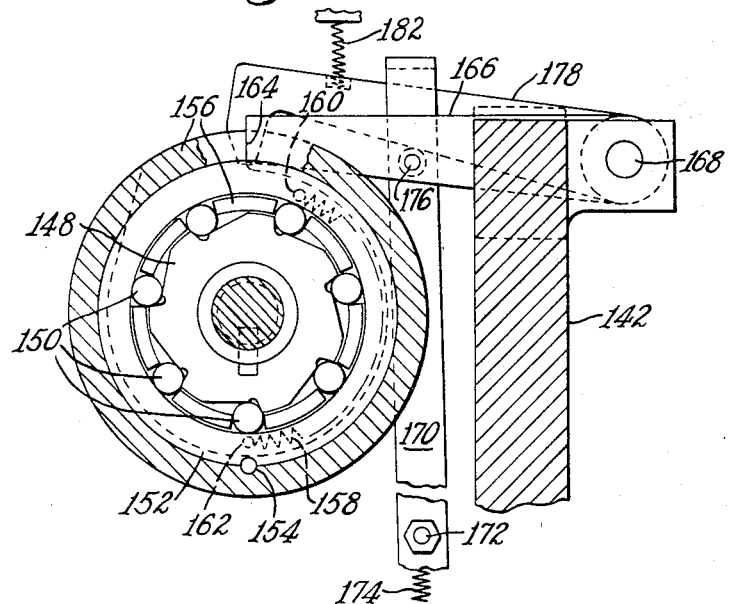
FIG. 5 is a sectional view partly broken away and in section of the clutch shown in FIG. 4, taken along the line V—V in that figure.

The welt scarfing mechanism is driven from the main sewing shaft 32 of the machine, so that it is possible to rotate the welt scarfing rolls with a feeding movement of the welt toward a shoe at the same speed as the shoe is fed by the stitch forming devices while inserting a seam, regardless of whether the machine is operating at high or low speeds. For this purpose the main shaft 32 has secured to it a worm 136 (FIGS. 1 and 4). The worm 136 meshes with the teeth on a hollow worm wheel 138 forming the driven member of a one-revolution clutch. The worm wheel 138 has a hub mounted in a friction reducing bearing 140 secured to one of a pair of side plates on a bracket frame 142, the frame 142 being fixed to the main frame of the machine. Rotatable inside of the worm wheel 138 is a stud shaft 144 having an enlarged hollow head, on which is keyed the driven member 146 of the one-revolution clutch. Also keyed to the head of the stub shaft 144 is a notched disk 148 within tapered notches of which are fitted a series of rolls 150 (FIG. 5) retained in place by a hardened ring 152 pressed into close fitting engagement with a side recess of the worm wheel 138. To retain the ring 152 more positively in position within the recess of the worm wheel 138, a pin 154 is driven into a drilled opening intersecting the inner and outer peripheries of the parts.

To cause the driven parts 146, 148 of the one-revolution scarfing clutch to be rotated, radial projections of a spider 156 enter spaces in the ring 152 between the rolls 150 and the spider is rotated yieldingly with relation to the driven member 146 of the clutch in a direction to shift the rolls 150 into narrow portions of the notches in the disk 148, thus forcibly driving the disk 148 from the worm wheel 138. To rotate the spider yieldingly into driving position, it is acted upon by a coil spring 158 wrapped about the hub of the spider, its ends being connected to a pin 160 on the spider 156 and a pin 162 on the driven clutch part 146. To bring the driven part 146 to rest at the end of a single rotation, a protecting flange on the spider 156 is formed with a radial shoulder 164, which is engaged by a stopping pawl 166 pivotally mounted on a pin 168. The pin 168 is secured within a lug on the bracket 142 and the stopping pawl is pressed yieldingly against the spider 156 through a pivotal connection with a vertical slide bar 170, having a tension spring 174 stretched between a pin 172 carried by it and a portion of the machine frame.

To prevent reverse rotation of the driven member relatively to the spider after the shoulder 164 is engaged by the stopping pawl 166, the pivotal connection with the slide bar 170 consists of a protecting pin 176 extending beneath a detent 178 rotatable loosely on the pin 168 and formed at its free end with wedging surfaces to engage a similarly shaped recess 180 (FIG. 4) in the driven part 146. The slide bar 170 is raised to cause the one-rotation clutch to be engaged and in so doing the pin 176 lifts the detent 178 from the recess 180, the rolls 150 being then jammed by the tapered notches against the ring 152. As the driven part 146 of the one-rotation clutch reaches a stopping position the detent moves into the recess 180 by reason of a compression spring 182 acting between the detent 178 and a fixed part of the machine frame.

To transmit rotation of the stub shaft 144 to the welt scarfing rolls 35 and 36, the hollow end of the stub shaft has fixed within it an alined shaft 184 mounted in a friction reducing bearing 186 in the other side plate of the bracket 142. Outside the bracket 142 there is mounted on the alined shaft 184 a bevel gear 188 meshing with a similar gear 189 secured to an inclined shaft 190 (see FIGS. 1 and 2). The lower end of the inclined shaft has an open box-like extension 192 and between its ends the inclined shaft is mounted in a combined thrust and radial bearing 194 secured to the bracket 142. The extension 192 loosely embraces a cross bolt 196 carried by a block 198 forming a part of a universal joint, the other part of which is indicated at 200. The part 200 is rigidly connected to a similar part 202 of a second universal joint, the corresponding part 204 of which is rotatable in a movable bearing 206 carried by a shiftable welt scarfing and severing casing 208.

The extension 192, the cross bolt 196, and the universal joints 198, 200 and 202, 204 represent a flexible coupling between the inclined shaft 190 and a bevel gear 210 (see FIGS. 1 and 3) meshing with a second bevel gear 212 keyed to a drive shaft 214 mounted in bearings formed in the scarfing roll case 208.

Figure 2:
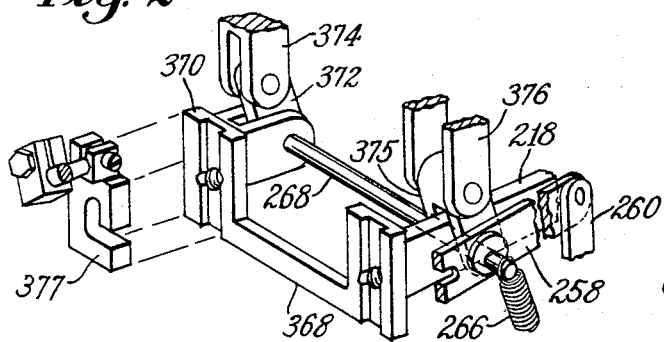
FIG. 2 is a perspective detail view on an enlarged scale of a welt scarfing mechanism and welt guide support in the machine head of FIG. 1.

The scarfing and severing casing 208 has a central passageway 216 (FIG. 19) running through it downwardly from the right side of the machine through which the welt 8 passes. From the scarfing and severing casing the welt passes into a conventional welt guide 217 (FIGS. 11, 21, 23, 35 and 38) with proper alignment of the passageway to enable the welt to be severed at the outlet of the passageway in the scarfing and severing casing and then to be advanced from the passageway into the welt guide without possibility of misalinement, so that the end of the welt may be brought into line with the path of the needle at the point of sewing operations in preparation for starting an inseam on a new shoe. The construction generally is similar to that found in the machine of inventor's Patent No. 3,055,323 in which a welt cutting guide is kept in alinement with the sewing guide. For this reason the scarfing casing 208 is mounted for movement with the sewing welt guide of the present machine on a shiftable carrier bar 218 (FIGS. 1 and 2). The movement of the carrier bar 218 is of a compound nature, so that the driving connections for the scarfing roll must include not only the universal joints above described but also the sliding connection afforded by the crossbolt 196 in the box-like extension 192, the crossbolt and box extension also serving as a convenient means for permitting removal of the scarfing and severing casing without dismantling any of the driving parts therefor.

Figure 30:
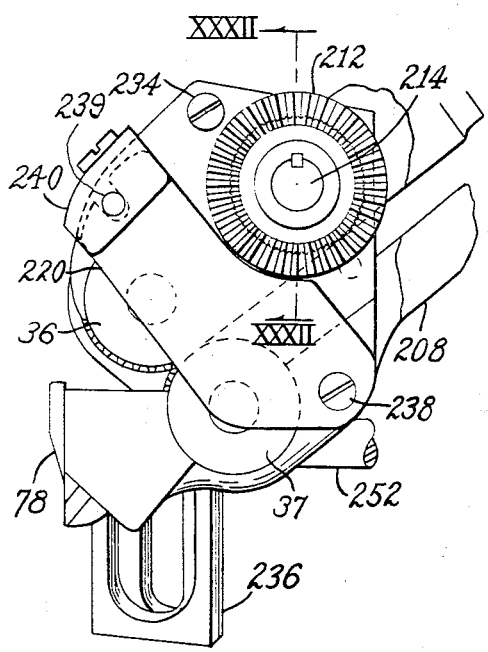
FIG. 30 is a front view of the welt scarfing and severing mechanisms employed in the machine, showing the driving connections.
Figure 31:
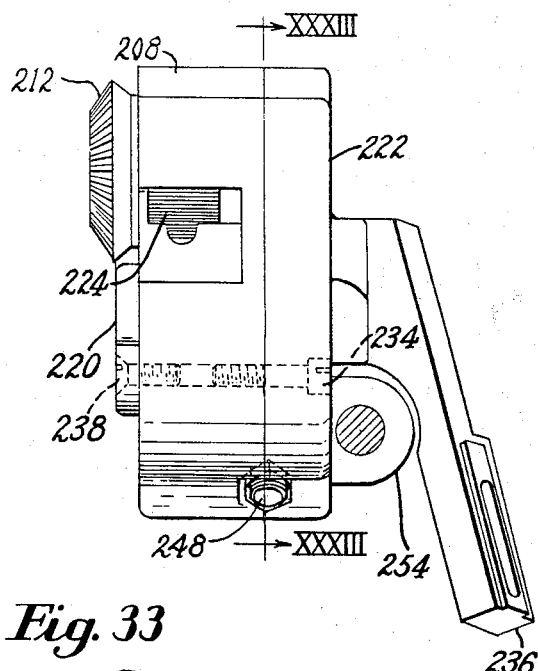
FIG. 31 is a view in right side elevation of the scarfing and severing mechanisms.
Figure 32:
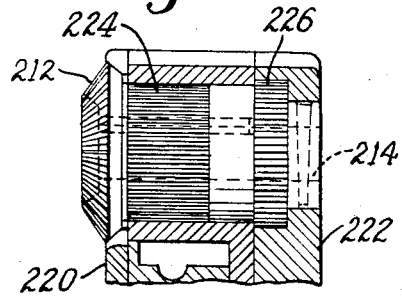
FIG. 32 is a sectional detail view taken along the line XXXII—XXXII of FIG. 30.
Figure 33:
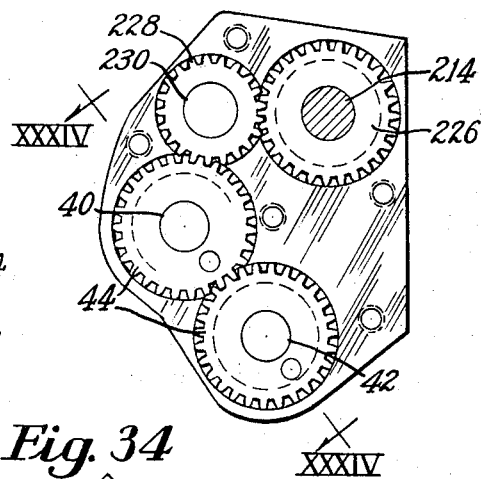
FIG. 33 is a sectional view of the scarfing and severing mechanisms taken along the line XXXIII—XXXIII of FIG. 31.

To support the scarfing rolls 35 and 36, the casing 208 consists of a main body block having a pair of cylindrical openings and front and rear cover plates 220 and 222, best shown in FIGS. 18, 30 and 31. Besides the cylindrical openings for the welt deforming and feeding rolls 35 and 36, the main body block of casing 208 also has a recess for a feed assist roll 224 (FIG. 32) whose periphery is corrugated with uniformly spaced teeth to assist in gripping a welt in the passageway 216. The feed assist roll 224 is keyed directly to the shaft 214 and to drive the deforming rolls the shaft 214 also carries a spur gear 226 pinned to the shaft with its hub surrounded by a bearing surface in the rear cover plate 222 (as shown in FIG. 32). To drive the deforming rolls in the proper directions, the gear 226 meshes with an idler 228 (FIG. 33) also mounted in a cylindrical opening in the rear cover plate 222 and supported on a stud 230 rotatable in the cover plate and the body block (see FIGS. 18 and 19). The idler 228 in turn meshes with the uppermost one of the deforming roll driving gears 44. The shafts 40 and 42 are secured at their rearward ends in the gears 44 the hubs of which are rotatable in bearings 232 for their support (note FIG. 34) in the cover plate.

To avoid displacement of the feed assist roll 224 axially from the rear cover plate 222, the roll 224 is slightly smaller in diameter than the gear 226 and the body block of casing 208 engages the gear 226 at its rearward side face sufficiently to hold it in place axially when the cover plate 222 is clamped to the body block of casing 208. For this purpose the body block is provided with a number of threaded passages engaged by clamp screws, one of which is shown at 234 (see FIG. 30). The rear cover plate also has projecting rearwardly and downwardly from it a mounting arm 236 (FIG. 31) having an elongated slot and tongue to enable clamping the scarfing casing to the welt guide carrier bar 218 (FIGS. 1 and 2). The front cover plate 220 for the casing 208 is similarly attached to the body block by screws 238 and when the front cover plate is removed the deforming rolls are readily accessible for replacement or cleaning for removal of chips.

To simplify removal of the front cover plate 220 it is slotted at its upper end to receive a pin 239 (FIG. 30) carried by an angle brace 240 fixed to the scarfing and severing casing 208. Thus, a single screw 238 enters the cover plate 220. Upon removal of the screw from the plate 220 it may be slipped out from under the brace 246.

Before the scarfing operations are started, the deforming and feed-assist rolls are stationary, the welt being drawn freely through the passageway 216 (FIG. 19) by the stitch forming and feeding devices of the machine. To free the welt passing between the deforming rolls, the flat sections 54 and 56 are located diametrically opposite each other. The feed assist roll 224 also has a smaller flat area 241 for a similar purpose. Once the rolls are started in rotation, however, they press forcibly against the welt, and provide sufficient thrust to insure clean severance of the chip 34 by the knife 38.

To guide the welt during its movement beneath the feed assist roll 224 as it approaches the deforming rolls 36 and 37, the passageway 216 is partially filled with a grooved plate 242 which is readily removable for substitution of other similar plates for different sizes or styles of welt. However, a single plate may be effective with several different sizes of welts or for plain or storm welts as the case may be, so long as the space between the feed-assist roll and the upper surface of the plate corresponds to the thickness of the welt. The presence of the groove in the guide plate does not interfere with the scarfing operation on a flat welt 8, such as shown in FIG. 9.

To hold the grooved plate 242 in place, its rearward end has a threaded opening to receive a screw 244 (FIG. 19) passing loosely through the body block of the casing 208. To guide the welt as it issues from between the bite of the deforming rolls 36 and 37, a second guide plate 246 is provided, having a contour similar to that of the plate 242. The second guide plate 246 rests on a projection of the body block and is perforated to receive a clamp bolt 248 passing through the body block, the guide plate and the scarfing knife 38. The opening in the scarfing knife for the bolt 248 is larger than the shank of the bolt and receives an eccentric portion of the bolt just beneath its head to enable the position of the knife to be shifted toward and from the deforming rolls, so that its cutting action may be readjusted readily after its cutting edge has been ground away in sharpening. Also secured in place by the bolt 248 on the upper surface of the scarfing knife is a deflector 250 for deflecting the chip 34. By the use of a deflector each chip is directed to the rear of the shoe being operated upon, so that it will not interfere with the sewing devices.

The welt cut-off knife 78 acts on the welt with a shearing action along the end surface of the guide plate 246. The welt cut-off knife is secured for swinging movement with a rockshaft 252 (see FIGS. 18, 19, 20, 22, 30 and 31). The rockshaft 252 is rotatable between its ends in spaced bearings formed by lugs 254 (FIG. 22) projecting from the main body block of casing 208, and at its rearward end has secured to it an arm 256. At the free end of the arm 256 projects a pin 257 entering a slot in one arm of a lever 258 (see FIGS. 1 and 3) fulcrumed to move with the carrier bar 218. The other arm of the lever 258 is pivotally connected to a downwardly extending link 260. The lower end of the link 260 is similarly connected to an armature 262 of an electromagnet 264 mounted on a projecting portion of the machine head. Whenever the electromagnet 264 is energized the welt cut-off knife is actuated. To return the welt cut-off knife to its inoperative position the armature 262 is connected by the lower end of a tension spring 266, the upper end of which is engaged with a pin 268 on the welt guide carrier bar 218 which also forms a fulcrum for the lever 258.

To initiate the operation of the welt scarfing clutch the slide bar 170 (FIGS. 1, 3, 4 and 5) has its lower end secured to an armature 270 of an electromagnet 272 mounted on an L-shaped bar 274 attached to the bracket frame 142. Energization of the electromagnet 272 raises the slide bar 170 to cause a single rotation of the welt scarfing clutch.

After the welt scarfing operation has been initiated and the minimum thickness area of the scarfed welt has reached the position of the cut-off knife 78, the welt is severed and the sewing is continued until the final stitch of the seam has been inserted across the severed end of the welt. Thereafter, the machine is brought to rest and mechanism is thrown into operation for advancing the scarfed end of the welt remaining in the machine to a position where it will be engaged by the stitch-forming devices in starting a new seam.

To prevent the welt from being severed until the scarfing action has more than half been completed, interlock means are provided between the scarfing and severing means, as will be described more fully.

The welt advancing mechanism comprises a toothed segment 276 (see FIGS. 1 and 40 to 43, inclusive). The welt advancing segment 276 is secured by a dowel pin and screw attachment 278 to a spur gear 280 rotatably mounted on a stud 282 secured in a box-like frame composed of parallel plates 284 and 286 spaced apart by a block 288, to which the plates are attached by screws 290. Meshing with the spur gear 280 is a second incomplete gear 292 rotatably mounted on a stud 294 passing loosely through openings in the plates 284 and 286 and being fixed at its rearward end to a bracket 296. The lower end of the bracket 296 is grooved to form a guide for the welt 8 beneath the segment 276 in such relation that the box frame 284, 286 may swing with the segment upwardly and downwardly away from the welt 8 about the stud 294.

To secure the bracket 296 to the machine frame, it has extending from it toward the left a perforated bar 298 through which passes a screw 300 for the lower end of the bracket. At its upper end the bracket 296 has an enlarged slotted lug through which passes a second screw 302 (FIG. 43) for fixing the position of the bracket on the machine frame.

To actuate the welt advancing segment 276 downwardly against the welt in the guide bracket 296, the gear 292 has secured to it an arm 304 to which is pivotally connected the upper end of a link 306. The lower end of the link 306 surrounds a bolt 308 (FIG. 1) having a thumb nut 310 for clamping it adjustably in position within an arcuate slot of an arm 312. The arm 312 is clamped to a rockshaft 314 rotatable in the machine frame and the rockshaft is operated by an eccentric driven by a one-revolution clutch mounted on a shaft 318, more fully disclosed in Patent No. 3,055,323. As in the machine of the prior patent the rockshaft 314 is given an oscillating movement first in one direction and then in the other each time a control shaft 316 located between the shafts 314 and 318 is rotated (see FIG. 3).

In the machine of the prior patent the oscillation of the rockshaft 314 is utilized to impart an advancing movement to the welt each time the machine is brought to rest at the end of the seam. This is accomplished in the prior machine by rotating the control shaft 316 through connections with the stopping mechanism. In the illustrated machine the control shaft 316 is actuated independently of the stopping mechanism, so that the welt may be advanced after the machine has been brought completely to rest. For this purpose the control shaft 316 has clamped to it an arm 320 the upper end of which is connected through a link 322 to the armature 324 of an electromagnet 326. The electromagnet 326 is mounted on a plate 328 made fast to the machine frame. By these connections the link 306 is raised and lowered each time the electromagnet 326 is energized and deenergized.

When the link 306 is raised, the gear 292 is rotated about the stud 294 and the box frame 284, 286 is caused to rotate with the gear 292 about the stud 294. The box frame also is moved about the stud 294 to shift the segment 276 downwardly into engagement with the welt 8, further swinging movement of the box frame thereafter being arrested. As the link 306 continues to rise, the gear 292 rotates the gear 280 on its stud 282, swinging the segment 276 while in engagement with the welt to advance it. To assist in rotating the box frame with the gear 292 the block 288 carries a pair of spring-pressed plungers 329 (FIG. 43), one of which engages the teeth of the gear 280 and the other which engages the teeth of the gear 292. The action of the plungers 329 on the gears is to increase the frictional resistance to rotation and thus to press the segment 276 firmly against the welt before advancing it. Similarly, during downward movement of the link 306 the segment 276 is first raised from engagement with the welt and then after the box-frame 284, 286 is returned to its original starting position, as shown in FIG. 43, the gears are rotated on their respective studs to return the segment to its original relative positions. To limit the return movement of the box-frame, the upper portion of the bracket 296 has threaded into it an adjustable bolt 330 having a locknut 332, which engages the upper surface of the block 288. Adjustment of bolt 308 in the slot of the arm 312 changes the length of welt advanced as required.

Figure 3:
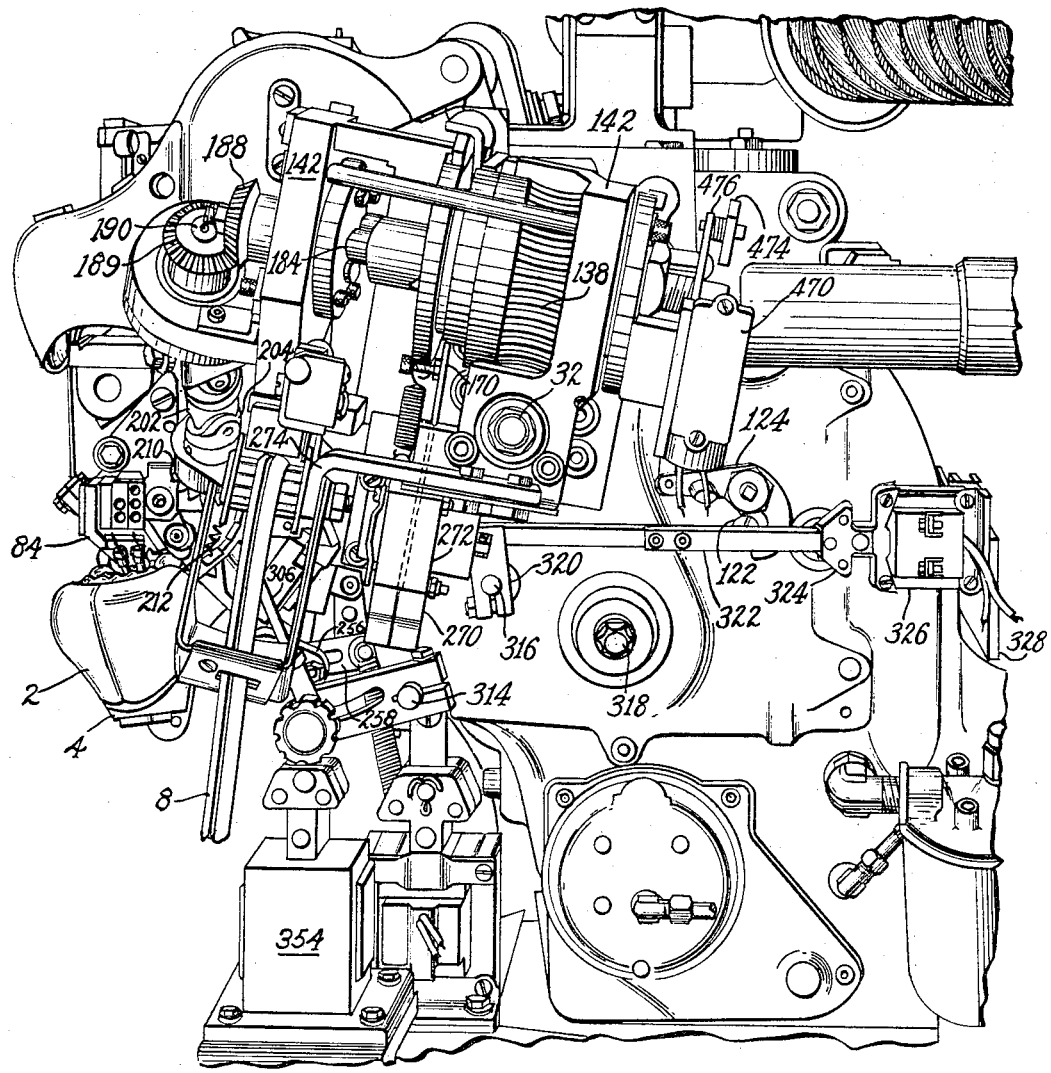
FIG. 3 is a perspective view, looking from the right side and showing other significant portions of the machine head.

In the machine illustrated in FIGS. 1 and 3 of the drawings, the welt scarfing mechanism carried by the casing 208 is intended for operation only upon leather welting, particularly wherein a bead on a storm welt is intended to be compressed beyond its elastic limit while preserving the finished grain surface on the welt. If it is desired to utilize welt composed of plastic material, the welt scarfing casing 208 is replaced by a casing 334 shown in FIG. 38. The casing 334 contains the same deforming rolls 36, 37 and the feed-assist roll 224, as well as the scarfing knife 38 and the cut-off knife 78. In addition to the scarfing and cut-off knives, the casing 334 has rotatably mounted in it a rockshaft 336 to which is pinned a cut-out knife 338. To receive the cut-out knife the upper welt guide plate 242 is replaced by a guide plate 340 having an opening 342 through which the cut-out knife 338 may engage the welt.

To actuate the cut-out knife 338 the shaft 336 extends rearwardly of the casing 334 and has secured to its end an arm 344 shown in FIGS. 38 and 39. Within the slot of the arm 344 extends a pin 346 mounted on one arm of a parallel armed lever 348, the other arm of which is connected by a link 350 to an armature 352 of an electromagnet 354 (FIG. 1). FIG. 1 illustrates the parallel armed lever 348 without the casing 334 for the cut-out knife 338, the casing 208 being shown in this figure. The electromagnet 354 is made fast to an angle bracket 356 mounted on the machine frame and the armature 352 is held in a normally raised position by a spring 357 stretched between it and the machine frame.

During the scarfing operation the length of the scarfed area on the welt may be affected to some extent by the thickness of the welt. Thus, the scarfing rolls have their surfaces arranged to cooperate satisfactorily upon different thicknesses of welt throughout the full range ordinarily utilized in making Goodyear welt shoes. However, thin welt is not compressed as much as thick welt while passing between the bite of the deforming rolls, but nevertheless the scarfing knife will cut proportionately deeper into thicker welt than it does with thinner welt. Thus, the rotation of the deforming rolls must be started in sufficient time to complete their operation on the thickest welt before the end of a seam, and if this is done, simple adjustments can be made to accommodate any minor variations in welt thicknesses and styles.

Figure 35:
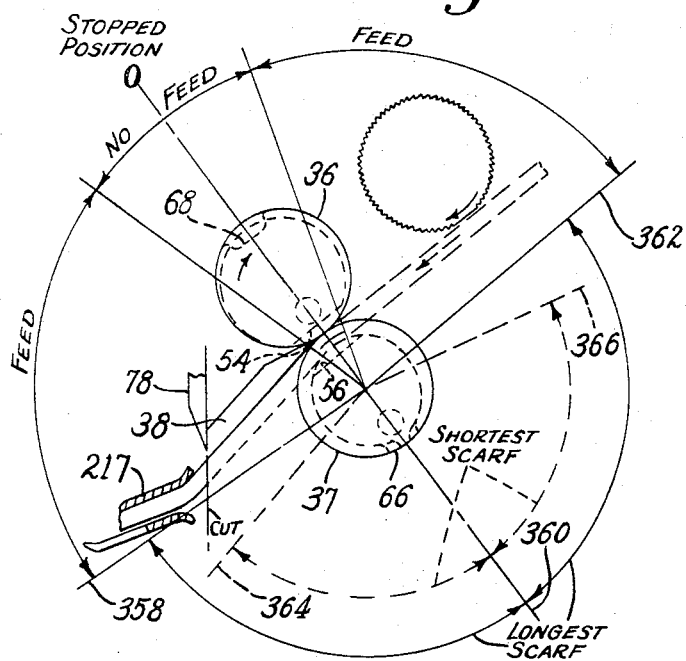
FIG. 35 is a diagrammatic view of the welt deforming rolls in the scarfing mechanism, illustrating the action of the rolls on different thicknesses of welt.

Reference to FIG. 35 illustrates diagrammatically how the projection 66 and the recess 68 are centralized along a common diameter of the rolls 36 and 37 before their rotation is initiated. Because of the flat faces 54 and 56 on the rolls, there is "No Feed" imparted to the welt by rotation of the supporting roll 36 throughout the angle so designated in FIG. 35. With the rolls rotating in the directions of the arrows, the longest area to be scarfed for the thickest welt extends from the solid line 358 through the line 360 to the solid line 362. The shortest scarfed area is included in the angle between the dotted lines 364 and 366. However, once having obtained the proper timing between the action of the welt deforming and feeding rolls and the cut-off knife 78, the same relationship is maintained regardless of the thickness of the welt, inasmuch as the timed relationship for movement of the welt from between the bite of the deforming rolls at the line 360 and the welt "Cut" line for the knife 78 always remains the same. Also, because the welt is fed by both the deforming and feed assist rolls throughout the complete rotation of the support roll 36, except through the angle labeled "No Feed" variation of feed by reason of different welt thicknesses is insignificant.

Figure 26:
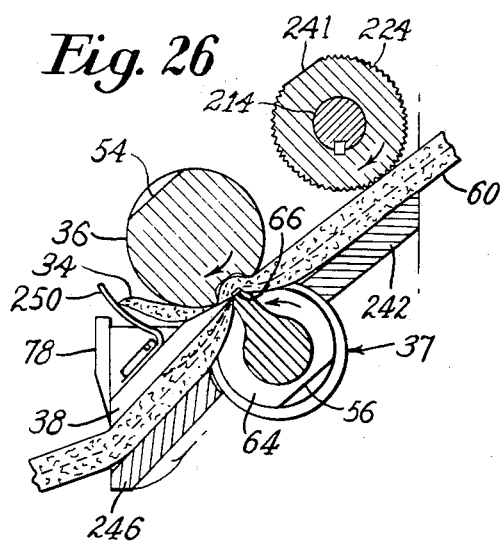
FIG. 26 is a sectional detail view similar to that of FIG. 21, omitting certain frame parts and illustrating the manner of operation upon the storm welt of FIGS. 24 and 25 in the scarfing mechanism after having completed the first half of the scarfed area.
Figure 27:
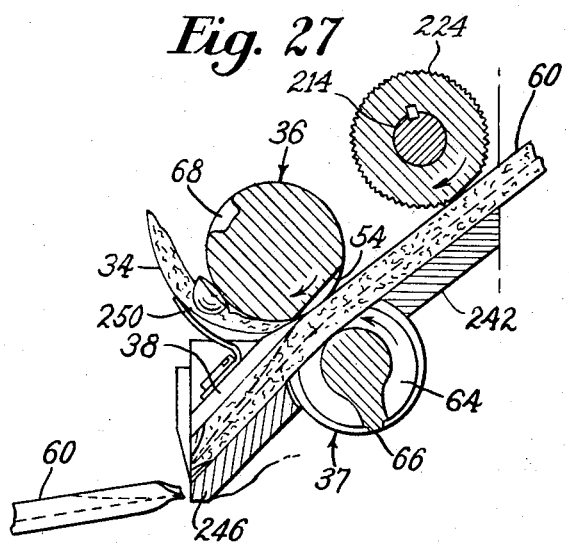
FIG. 27 is a sectional detail view with the parts in the same position as those of FIG. 23 to show the scarfing operation upon leather storm welt while nearing completion, the welt having been severed.
Figure 28:
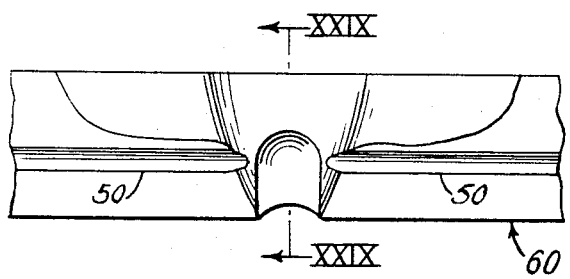
FIG. 28 is a plan view of the leather storm welt shown in FIGS. 24 and 25.

The operation of the deforming rolls is best illustrated beginning with FIG. 19 in their positions of rest, or with reference to the diagrammatic view of FIG. 35, at their zero positions. After the rolls have rotated approximately 180°, they reach the positions of FIG. 21 or 26, for flat or storm welts. After the rolls have nearly completed their rotation, the positions of FIGS. 23 and 27 are reached.

Because of the forces applied to the scarfing and welt cut-off mechanisms by their actuating linkages, the welt carrier bar 218 (FIG. 1), on which the scarfing and severing casing 208 is mounted, is reinforced in order to prevent relative displacement with relation to the welt guide. For this purpose the welt guide carrier bar 218, as best shown in FIG. 2, has a grooved terminal block connected integrally with an upright arm of a U-shaped cross brace 368. Another arm of the brace is similarly connected to a grooved terminal block 370. The block 370 has a rearwardly extending projection pivotally connected by the pin 268 to the lower end of a suspending link 372, the upper end of which is pivoted to a lug 374 comprising a portion of the machine frame. The carrier bar 218 also has a suspension link 375 parallel to the link 372 and pivotally connected at its upper end to a lug 376 on the machine frame, so that swinging movement of the grooved terminal blocks at the ends of the support bar 368 produces corresponding movements to the blocks.

Instead of mounting the welt guide directly on the carrier bar 218 it has a plate 377 formed with a tongue fitting within the groove of the block 370 but the welt scarfing and cut-off casing is attached directly to the carrier bar. By this arrangement, rigid and secure mountings are provided for both the welt guide and and scarfing and cut-off mechanisms, so that when the welt is advanced after the sewing operations have been terminated, it will be guided through the scarfing and cut-off casing directly into the welt guide to a position where it will be engaged by the needle with reliability.

By reason of the arrangement of the machine embodying the invention, the operator of the machine is encouraged to operate the machine as nearly as possible at full speed throughout the insertion of an inseam. With prior machines of the same nature, the only times at which the operator finds it desirable to slow the machine down by partially releasing the control treadle 118 is while sewing about the toe of the shoe and just before the end of the seam is reached, so that stitches will not be inserted in the welt and upper beyond the end of a sewing rib. In the present machine the speed of sewing may be maintained at a maximum by reason of automatic control for the auxiliary operations. By reason of the automatic control the driving mechanism is locked out of operation until a shoe is properly presented to the machine, initiation of welt butting operations occurs during continued sewing of the inseam, and cutting the welt takes place after stopping the machine. The automatic controls are accomplished by proper coordination in timed relations for the various mechanisms involved, and to the extent that a uniform high speed of sewing is maintained. The uniformity of insertion of successive stitches is greatly enhanced. For this reason, the timed relations between the initiation of the different auxiliary operations may be accomplished merely by independent timing devices which have no direct mechanical connection with the particular mechanisms, such as has been attempted in prior machines of similar nature by the use of pattern control cam shafts.

For stopping the machine, the connection between the driving mechanism and the treadle is disconnected, so that the operator may maintain pressure on the treadle continuously during sewing without interfering with the stopping operation. This is accomplished through the disconnectable treadle connections by breaking the joint between the members of the toggle 112, shown in FIG. 7. To break the joint in the toggle 112, its central pivot is connected by a link 378 (FIG. 7) to a bell crank 380 fulcrumed on a base plate 382 mounted beneath the sewing head in the machine frame. The lower arm of the bell crank 380 is slotted and surrounds a pin 384 on an armature 386 for an electromagnet 388 mounted on the plate 382, the plate also carrying a fulcrum 392 for the treadle actuated level 114. When the electromagnet 388 is energized, the lever pulls the toggle joints 112 out of alinement, so that pressure on the high-speed driving clutch 92 is released and the stopping mechanism immediately brings the machine to rest within a single rotation of the main sewing shaft 32 regardless of the position of the treadle 118.

Figure 44:
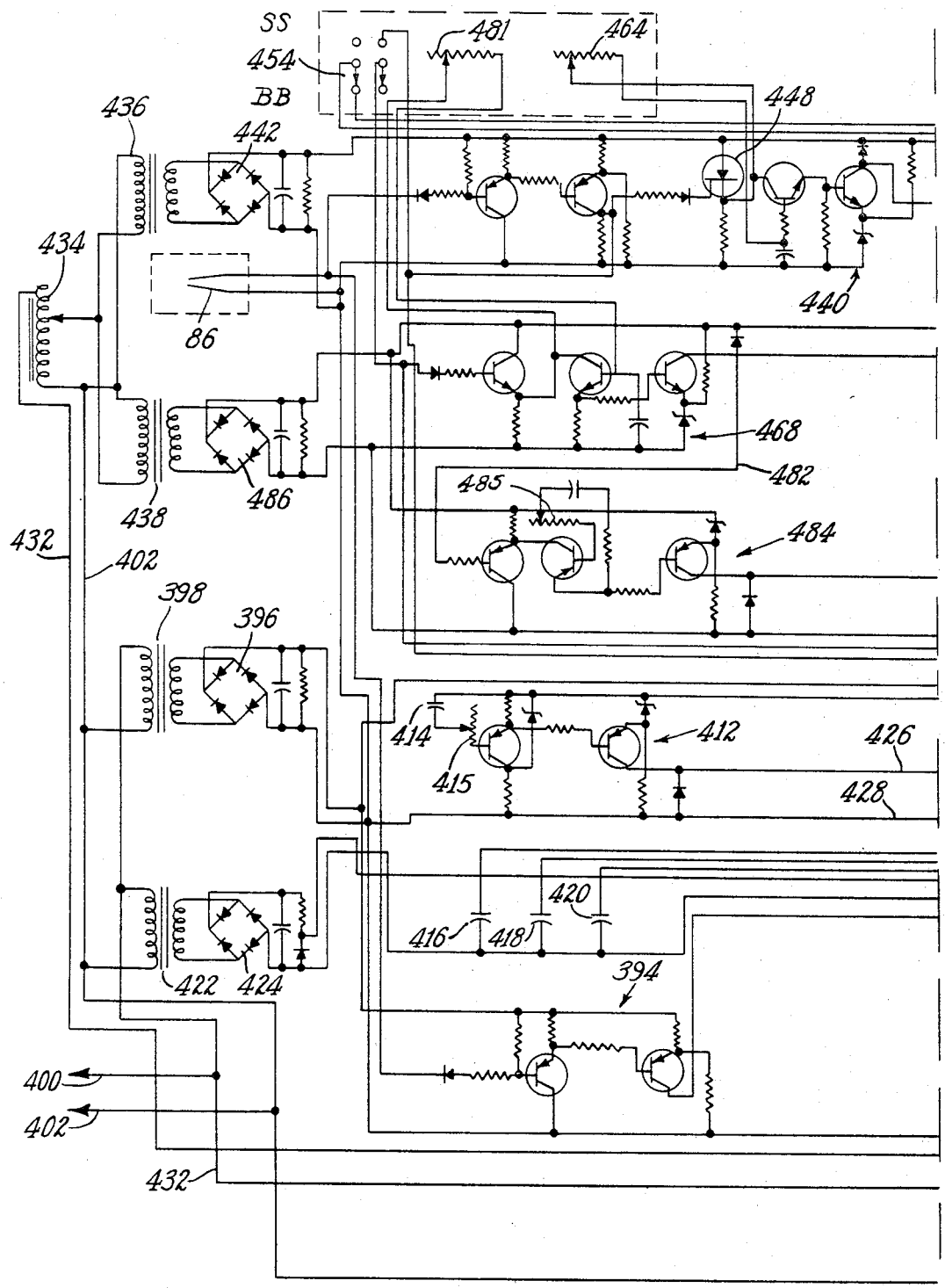

The form of automatic control found to be most successful, as well as simple in construction and maintenance, is adaptable for relatively simple electrical circuitry illustrated in FIGS. 44 and 45. Referring to FIG. 45, six electromagnets are indicated along the right margin of the sheet containing this figure, the numerals employed corresponding to those in the other views. Further to facilitate an understanding of the circuitry the designations "Welt advance"—326, "Start"—134, "Scarfing"—272, "Cut-off"—264, "Cut out"—354 and "Stop"—388 have been applied to the electromagnets.

Any attempt on the part of the operator to depress the treadle 118 before a shoe is presented to the machine with contacts 86 engaging the starting mark 80 on the shoe will be ineffective until the "Start" electromagnet 134 is energized. As a result, an operator soon develops the practice of applying pressure to the treadle and then presenting the shoe in proper position. As soon as the mark 80 engages the feelers 86, the treadle connections become unlocked and the pressure on the treadle is transferred to the main driving clutch. The machine then immediately starts in operation, as a result of additional downward movement of the treadle. After being unlocked by the slide block 128, the arm 126 (FIG. 8) moves to the right past the end of the slide bolt 128 to hold the slide bolt from again locking the arm 126 until the connections are shifted to energize the "Stop" electromagnet 338 to bring the machine to rest.

To energize the "Start" electromagnet 134 the feeler contacts 86 (FIG. 44) are connected to a transistor amplifier 394 supplied with direct current from a rectifier 396. The rectifier 396 in turn is powered by a transformer 398 the primary winding of which is energized by a source of supply from an alternating current line 400, 402. The output of the amplifier 394 is connected to the coil of a relay 404 having a pair of parallel sets of contacts for energizing the "Starting" electromagnet 134.

When the treadle 118 is fully depressed to start the machine the arm 126 (FIG. 8) operates a pair of switches 406 and 408. The switch 406 is of the normally closed type, and the switch 408 of the normally open type, so that when the treadle is fully depressed in starting the machine, the switch 406 is opened and the switch 408 is closed. Closure of the switch 408 completes the circuit to a relay 410, the coil for which is connected to one side 400 of the alternating current line, the other side 402 of which has a common connection with the switches 406 and 408.

The relay 410 has normally open contacts which are closed when its coil is energized for initiating the operation of a time delay arming unit 412 which, after a lapse of time sufficient to complete the sewing operation along one side of the shoe and part way along the other side acts to arm the scarfing mechanism, so that it is now capable of operation as a result of engagement of the feeler contacts 86 with the scarfing mark 88 on the shoe. The arming unit 412 comprises a transistor amplifying circuit including a 100 microfarad condenser 414 having in series with it a potentiometer 415 for adjusting the length of the time delay. The purpose of the arming unit 412 is to avoid improper operation of the scarfing mechanism in case of accidental engagement of any conducing material with the contacts 86 before the mark 88 on the shoe is reached. By shifting the adjustment of the potentiometer 415, the delay required before the scarfing circuit is armed, ready for operation through the engagement of the mark 88 with the contacts 86, may be increased for a large size shoe or decreased for a smaller shoe.

In setting the "Scarfing" and other mechanism in operation, a single pulse is applied to the corresponding electromagnets from suitable condensers 416, 418 and 420 connected in a group and charged from a separate direct current source including a transformer 422 connected across the A.C. source 400, 402. The transformer 422 feeds a rectifier 424 running to the pulsing condensers.

Similarly, the arming amplifying unit 412, having its own transformer 398 directly connected to the A.C. supply 400 and 402, feeds the rectifier 396 in circuit with the coil of relay 410 controlled thereby. Otherwise, the circuits to the electromagnets 272, 264, 354, 388 and 326 would be held inoperative from lack of connection to the main supply source 400, 402. Thus, until the time delay of the scarfing mechanism arming unit 412 has run out there is no connection to a supply source for energizing the other electromagnets.

After the inseam has been completed on one side of the shoe and has been started along the other side, time delay initiated by the arming unit 412 having elapsed, current is transmitted through wires 426 and 428 to a relay 430, to close its normally open contact, thereby completing a connection of one side 400 of the supply line to an auxiliary line 432. The auxiliary line 432 extends to an autotransformer 434 which is already connected to the other side 402 of the supply line. The output of the auto-transformer 434 is divided between two isolation transformers 436, 438, so that when these transformers are energized, control circuits for the other electromagnets are rendered operative.

When the feeler contacts 86 are engaged by the scarfing mark 88 a scarfing amplifier unit 440, which has its control electrodes connected to the output of a rectifier 442, is energized by the transformer 436, is rendered operative to energize a relay 444, disconnecting a charging contact of the relay from the pulse condenser 416, and connecting the pulse condenser to a relay 446. The pulse produced by the condenser 416 in the relay closes a pair of normally open contacts to energize the coil of the "Scarfing" electromagnet 272. In so doing, the armature 270 of the electromagnet is actuated to set in motion the one-revolution shaft 184. As soon as the charge on the pulse condenser 416 has been dissipated the relay 446 opens its contact and the "Scarfing" electromagnet is deenergized.

The scarfing amplifier unit 440 is arranged to remain conductive and continues to supply current for the relay 444, so that no further pulses are applied to relay 446. This is accomplished by the use of a silicon controlled rectifier 448 Type T1–145–A2. At the same time that the relay 444 is energized, a digit Model No. 6000–1 time delay control 450 has its timing circuit initiated by reason of an auxiliary set of contacts 452 actuated by the relay 444. The time delay control 450 is energized by connections with the lines 400 and 402 from a double pole, double throw selector switch 454 shown in FIG. 44, the purpose of which switch will be more fully explained. The adjustment of the time delay control 450 is such that as the scarfing rolls 36 and 37 rotate, a double throw switch 456 in the time delay control will be shifted from its normally closed contact position to a normally open contact position. In the normally closed contact position of the switch 456, a pulse condenser 458 is connected directly across the rectifier 424 for charging that condenser, and when the switch 456 is in closing position for its normally open contacts, the pulse condenser 458 is connected directly across the coil of a relay 460, causing it to close its normally open contacts momentarily. Closing the normally open contacts of the relay 460 energizes the coil of the "Cut-out" electromagnet 354 to swing the cut-out knife 338 through an arc of approximately 90° and to remove the chip 72 from the rib of a plastic storm welt when required. If a leather welt is utilized, or for any other reason it is unnecessary to actuate the cut-out knife, a manual disconnecting switch 462 is shifted to disconnect the relay 460 from the line.

If the inseam sewing machine of the invention is utilized for operation upon Goodyear welt shoes, in which the welt is sewn from breastline to breastline only, the selector switch 454 is left in the solid-line position BB, in which the "Scarfing" electromagnet 272 and the "Cut-out" electromagnet 354 may also be included in the circuit with the scarfing amplifying unit 440. If a Goodyear welt shoe is being operated upon in which the welt is sewed both around the heel seat as well as about the forepart of the shoe, the selector switch 454 is shifted to its uppermost broken-line position SS, in which the circuits to the "Scarfing" electromagnet 272 and the "Cut-out" electromagnet 354 are disconnected from the line 402. Under these conditions the "Scarfing" and "Cut-out" mechanisms will be rendered inoperative.

After the "Scarfing" and "Cut-out" mechanisms have actuated the scarfing amplifying unit becomes inoperative to any further engagement of the feeler contacts 86 with conductive markings, inasmuch as the silicon rectifier 448 continues to maintain that amplifier in conducting condition, so that the relay 444 thus remains energized. The pulse condenser 416, however, having lost its charge, through actuation of the relay 446, the contacts of that relay are open and no further charge is applied to the pulse condenser 416. Also, because the digit time delay control 450 remains energized, the normally open contacts of the switch 456 remain closed, so that the relay 460, which was actuated momentarily by the pulse condenser 458, is subject to no further energization.

To enable adjustments in timing of the "Scarfing" and "Cut-out" operations, the scarfing amplifier is provided with a potentiometer 464 and the time delay control 450 has a potentiometer 466.

To prevent the energization of the "Cut-off" and "Stop" electromagnets 264 and 388 while the "Scarfing" and "Cut-out" electromagnets 272 and 354 are being energized, connections from the first two stages in the "Scarfing" amplifier 440 are utilized to act as a pre-amplifier for a "Cut-off" amplifier 468, but the connections between the first two stages of the "Scarfing" amplifier 440 are disconnected from the "Cut-off" amplifier 468 by interlock means comprising a normally open switch 470.

The interlock switch 470 is made fast to the frame of the machine and is actuated by a plunger 472 arranged in the path of a finger 474 adjustably attached to a disk 476 (see also FIGS. 1 and 3). The disk 476 is made fast to the stub shaft 144 of the one-revolution scarfing clutch. Actuation of the switch 470 arms the circuit running to the "Cut-off" amplifier 468, so that after closure of the switch the engagement of the cut-off mark 90 with the feeler contacts 86 will cause the amplifier 468 to transmit current through the coil of a relay 478. Energization of the relay 478 disengages a normally closed contact connected for charging the pulse condenser 418 from its charging rectifier 424 and a normally open contact is connected with the charged condenser to apply the charge to a coil of a relay 480. The relay 480 has normally open contacts which connect the "Cut-off" electromagnet 264 with the auxiliary supply line 432, the other side of the "Cut-off" electromagnet being connected to the power line 402. To adjust the time of operation of the "Cut-off" electromagnet 264 the "Cut-off" amplifier has a potentiometer 481 connected through a condenser across one of the units in the amplifier. Actuation of the "Cut-off" knife 78 severs the welt along the section of minimum thickness to form the trailing butted end of the welt length being attached to the shoe and the leading butted end of the welt for attachment to the next succeeding shoe.

Thereafter, the stopping mark 80 which also is a continuation of the starting mark for the shoe engages the feeler contacts 86 to again energize the "Cut-off" amplifier 468, which has a connection 482 with a stopping amplifier 484 supplied with direct current from a rectifier 486 connected to the transformer 438. The output of the stopping amplifier 484 is connected to a relay 488 having charging and discharging contacts for the pulse condenser 420. Normally open, discharging contacts for relay 488 connect the pulse condenser 420 to the coil of a relay 490 having two sets of normally open contacts, the uppermost one of which is arranged to energize the "Stop" electromagnet 388 and the lowermost one of which is connected in series with the normally closed treadle actuated switch 406. When the "Stop" electromagnet 388 is energized, the treadle 118 is disconnected from control of the driving mechanism and the machine is brought to rest. To enable one or more stitches to be inserted beyond the cut-off end of the welt the stopping amplifier 484 has a potentiometer 485 with series condenser for regulating the time of stopping.

In disconnecting the treadle from control of the driving mechanism the toggle 112 (FIG. 7) is broken and the rockshaft 108 is rotated to reengage the contacts in the switch 406. Reengagement of contacts in switch 406 energizes the coil of a relay 492 through the lowermost contacts of relay 490. The relay 492 has two sets of normally open contacts, one set of which through the normally closed contacts of a relay 494 maintains the coil of the relay 494 maintains the coil of the relay 492 closed an dthe other set of which initiates the operation of a digit Model No. 6000–1 time delay control 496. Power for time delay control 496 is supplied by the alternating current lines 400 and 402.

The control 496 has a set of normally open contacts connected to actuate the "Welt Advance" electromagnet 326. The resulting time delay control thus enables the welt to be advanced in the machine after being severed and the machine brought to rest, so that the properly butted leading welt end may be brought into the point of operation of the machine in preparation for sewing a new shoe without interfering with other operations. The digit time-delay control 496 is provided with a potentiometer 498 for enabling ample elapsed time for the machine to be brought to rest after the trailing end of the welt is sewen to a shoe. At the end of the time to which the potentiometer 498 is set, the normally open contacts of the control are closed to energize the relay 494, thus opening the circuit to the relay 492.

To sew shoes in which the inseam is inserted entirely around the heel seat the selector switch 454 is moved to the upper "SS" position, disconnecting the circuits to the "Scarfing" and "Cutout" amplifiers. However, the "Cut-off" amplifier 468 alone is reconnected to the right-hand contacts. When the selector switch is in the upper "SS" position the trailing welt end is cut to match the leading end of the welt first attached to the shoe and the seam is continued across the two matched ends. The angle at which the cut-off knife 78 is disposed causes two matching bevel cuts to be formed at each end of the length of welt.

In sewing a sewed heel seat shoe a single conductive mark only is applied to the starting side of the insole of a shoe, that mark corresponding to the mark 80, except that there is no need for it to be applied entirely across the heel seat. At the end of an operation on a sewed-heel-seat shoe when the feeler contacts 86 engage the conductive mark 88, "Stop" and "Welt advance" electromagnets also are energized in the proper sequence.

The nature and scope of the invention, together with procedures followed thereby, having been particularly described, what is claimed is:

1. A machine for attaching a welt to other parts of a Goodyear welt shoe, said machine having attaching, feeding and guiding devices for the shoe parts, in combination with means engaging the welt progressively in advance of the point of operation of the attaching devices for reducing the thickness of the welt, first between an area of maximum thickness decreasing to one of minimum thickness and thereafter from the area of minimum thickness increasing to one of maximum thickness.

2. A machine for attaching a welt to other shoe parts, as in claim 1, in which there is provided additional means engaging the welt between the point of operation of the attaching devices and the reducing means for severing the welt along the minimum thickness area to provide a trailing end on the welt being attached to the shoe and a leading end on the welt to be attached to the next shoe operated upon.

3. A machine for attaching a welt to other shoe parts, as in claim 1, in which the reducing means comprises a contoured welt deforming matrix and a knife acting on the welt at a point engaged by the matrix to trim a chip of maximum thickness at the minimum thickness area of the welt.

4. A machine for attaching a welt to other shoe parts, as in claim 3, in which the deforming matrix comprises a roll rotating continuously in engagement with the welt from its maximum thickness area through the minimum thickness area and until the maximum thickness area again is reached.

5. A machine for attaching a welt to other shoe parts, as in claim 4, in which there is provided a second contoured welt deforming roll complemental in shape to the first-mentioned roll to distort the welt thicknesswise while the chip is being trimmed by the knife into a continuously varying configuration at successive sections engaged by the knife.

6. A machine for attaching a welt to other shoe parts, as in claim 5, in which both rolls are formed with flat areas and there is provided a geared connection between the rolls to bring their flat areas into opposed relation after the chips has been completed, the spacing between the flat areas providing clearance for free movement of the welt during the remainder of the attaching operation.

7. A machine for sewing a welt to a last supported Goodyear welt upper and sole member, said machine having stitch forming, feeding and guiding devices for the shoe parts, and means located in advance of the point of operation of the stitch forming devices for severing the welt before the sewing is completed, in combination with means located in advance of the welt severing means to compress the welt substantially beyond its elastic limit and to deform permanently the cross-sectional area of the welt at a position where it is to be severed.

8. A machine for sewing a welt to other shoe parts, as in claim 7, in which the compressing means comprises a pair of opposed rolls having contoured surfaces between which the welt passes, and timing mechanism is provided for causing the welt severing means to be actuated when the compressed sectional area of the welt reaches severing position.

9. A machine for sewing a welt to other shoe parts, as in claim 8, in which the contour of the rolls provides a clearance space for free movement of the welt during a major portion of each sewing operation.

10. A machine for sewing a welt to other shoe parts, as in claim 9, in which there is provided shoe engaging means for initiating rotation of the rolls as the operation of the stitch forming devices is continuing.

11. A machine for sewing a welt to other shoe parts, as in claim 10, in which the operation of the timing means for the welt severing means also is initiated by the shoe engaging means.

12. A machine for sewing a welt to other shoe parts, as in claim 11, in which there is provided a stopping mechanism for the machine under control of the shoe engaging means to bring the machine to rest after the welt has been severed.

13. A machine for sewing a welt to other shoe parts, as in claim 12, in which the stopping mechanism acts after at least one stitch has been inserted in the insole beyond the end of the welt.

14. A machine for sewing a welt to a last supported Goodyear welt upper and sole member, said machine having stitch forming, feeding and guiding devices for the shoe parts, and means located in advance of the point of operation of the stitch forming devices for scarfing an area of the welt to prebutt and thereafter to sever the trailing end of the welt to be attached to the other shoe parts by the stitch forming devices, in combination with sensing means acting in response to a plurality of indicia sequentially along the shoe being sewn to control the scarfing and severing action.

15. A machine for sewing a welt to a last supported Goodyear welt upper and sole member, as in claim 14, in which the sensing means engages the sole member in line with a series of indicator marks on the sole member in positions to be engaged sequentially by the sensing means.

16. A machine for sewing a welt to a last supported Goodyear welt upper and sole member, as in claim 14, in which there are provided interlock means between the scarfing and severing means for preventing the welt from being severed until the scarfing action has more than half been completed.

17. A machine for performing an operation on a shoe provided with starting and stopping marks, said machine having driving and stopping mechanisms, a treadle for controlling the driving and stopping mechanisms to drive the machine at a variable speed under the control of an operator and to enable the machine to be brought to rest before the operation is completed, disconnectible connections between the driving and stopping mechanisms and the treadle, means for locking the connections to prevent the machine from being started and means for disconnecting the connections to bring the machine to rest, in combination with a feeler arranged for engagement with the starting and stopping marks to prevent the machine to be started when the treadle is depressed and to stop the machine with certainty regardless of the position of the treadle.

18. A machine for sewing a welt to other parts of a Goodyear welt shoe provided with starting and stopping marks, said machine having driving and stopping mechanisms, a treadle for controlling the driving and stopping mechanisms to drive the machine at a variable speed under the control of the operator and to bring the machine to rest, disconnectible connections between the treadle and the stopping mechanism, means for locking the connections to prevent the machine from being started, and means for disconnecting the connections to bring the machine to rest regardless of the position of the treadle, in combination with a feeler arranged for engagement with the starting and stopping marks on the shoe to enable the machine to be started when the shoe is presented with the starting mark in engagement with the feeler and to prevent the machine from continuing in operation after the stopping mark comes into engagement with the feeler.

19. A machine for sewing a welt to other parts of a Goodyear welt shoe provided with starting, stopping and auxiliary operation initiating marks, said machine having driving and stopping mechanisms, a treadle for controlling the driving and stopping mechanisms to drive the machine at a variable speed under the control of the operator and to bring the machine to rest, disconnectible connections between the treadle and the stopping mechanism, means for locking the connections to prevent the machine from being started, and means for disconnecting the connections to bring the machine to rest regardless of the position of the treadle, in combination with a feeler arranged for engagement with the marks on the shoe to enable the machine to be started when the starting mark engages the feeler and to prevent the machine from continuing in operation when the stopping mark comes into engagement with the feeler, and means to initiate at least one of the auxiliary operations after the machine has been brought to rest.

20. A machine for attaching a welt to other parts of a Goodyear welt shoe, said machine having stitch forming and auxiliary operation performing devices, in combination with a single sensing device acting in response to a plurality of indicia sequentially along a shoe to control the auxiliary operations.

21. A machine for attaching a welt to other shoe parts of a Goodyear welt shoe provided with a series of marks located along a line in which a seam is to be inserted, said machine having stitch forming and auxiliary operation performing devices, in combination with a single sensing device acting along the line of marks to initiate sequentially the operation of the auxiliary devices.

References Cited

UNITED STATES PATENTS

| | | | |
|---|---|---|---|
| 1,510,723 | 10/1924 | Topham | 12—142 |
| 3,055,323 | 9/1962 | Miller et al. | 112—46 |
| 2,921,389 | 1/1960 | Ferreirn | 36—17 |
| 3,025,544 | 3/1962 | Fake et al. | 12—142 |
| 3,064,595 | 11/1962 | Miller | 112—46 |

PATRICK D. LAWSON, *Primary Examiner.*